US012761853B2

(12) United States Patent
Lee et al.

(10) Patent No.: US 12,761,853 B2
(45) **Date of Patent: *Oct. 13, 2026**

(54) ELECTRONIC DEVICE FOR CONTROLLING DISPLAY CORRESPONDING TO DIRECTION OF EXTERNAL ELECTRONIC DEVICE, OPERATION METHOD THEREOF, AND STORAGE MEDIUM

(71) Applicant: SAMSUNG ELECTRONICS CO., LTD., Suwon-si (KR)

(72) Inventors: Nina Lee, Suwon-si (KR); Sangheon Kim, Suwon-si (KR); Yeunwook Lim, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 19/033,483

(22) Filed: Jan. 22, 2025

(65) Prior Publication Data

US 2025/0173106 A1 May 29, 2025

Related U.S. Application Data

(63) Continuation of application No. 18/457,336, filed on Aug. 29, 2023, now Pat. No. 12,229,465, which is a (Continued)

(30) Foreign Application Priority Data

Aug. 30, 2022 (KR) ........................ 10-2022-0108896
Oct. 12, 2022 (KR) ........................ 10-2022-0130825

(51) Int. Cl.
*G06F 3/14* (2006.01)
*G06F 1/16* (2006.01)

(52) U.S. Cl.
CPC .......... *G06F 3/1423* (2013.01); *G06F 1/1616* (2013.01); *G06F 1/163* (2013.01); *G06F 3/1454* (2013.01)

(58) Field of Classification Search
CPC ..................................................... G06F 3/0488
See application file for complete search history.

(56) References Cited

U.S. PATENT DOCUMENTS 8,983,539 B1 3/2015 Kim et al.
11,287,896 B2 3/2022 Yang
(Continued)

FOREIGN PATENT DOCUMENTS

CN 110602315 A 12/2019
JP 2021174151 A 11/2021
(Continued)

OTHER PUBLICATIONS

International Search Report mailed Nov. 22, 2023 for PCT/KR2023/012515.
(Continued)

*Primary Examiner* — Nan-Ying Yang
(74) *Attorney, Agent, or Firm* — CANTOR COLBURN LLP

(57) ABSTRACT

An electronic device includes a first display, a second display disposed in a direction opposite to the first display, a processor and memory storing instructions, which when executed, cause the electronic device to output a content through the first display. The instructions are configured to cause the electronic device to identify a direction of an external electronic device connected to the electronic device through short-range communication scheme with respect to the electronic device while outputting the content. The instructions are configured to cause the electronic device to, in response to identifying that the direction of the external
(Continued)

(a) Front position (b) Side position (c) Rear position electronic device is within a first range of directions, keep outputting the content through the first display. The instructions are configured to cause the electronic device to, in response to identifying that the direction of the external electronic device is within a second range of directions, output the content through the second display.

20 Claims, 22 Drawing Sheets

Related U.S. Application Data continuation of application No. PCT/KR2023/012515, filed on Aug. 23, 2023.

(56) References Cited

U.S. PATENT DOCUMENTS

| | | | | |
|---|---|---|---|---|
| 11,372,446 | B2 | 6/2022 | Wi et al. | |
| 2010/0188426 | A1* | 7/2010 | Ohmori | G06F 3/0481 345/660 |
| 2011/0283334 | A1* | 11/2011 | Choi | H04L 67/148 725/148 |
| 2013/0055103 | A1 | 2/2013 | Choi et al. | |
| 2013/0065614 | A1* | 3/2013 | Jung | G06F 3/044 455/418 |
| 2013/0249873 | A1* | 9/2013 | Zhang | G09G 3/20 345/204 |
| 2014/0028688 | A1* | 1/2014 | Houjou | G04G 9/0064 345/520 |
| 2014/0152553 | A1 | 6/2014 | Cha et al. | |
| 2014/0191948 | A1 | 7/2014 | Kim et al. | |
| 2016/0124579 | A1* | 5/2016 | Tokutake | G06F 3/0481 345/156 |
| 2018/0356904 | A1 | 12/2018 | Disano et al. | |
| 2019/0138092 | A1* | 5/2019 | Song | G06F 3/013 |
| 2019/0163432 | A1 | 5/2019 | Files et al. | |
| 2020/0379707 | A1 | 12/2020 | Kwon et al. | |
| 2021/0096675 | A1 | 4/2021 | Klein et al. | |
| 2021/0335320 | A1 | 10/2021 | Tokuchi | |
| 2022/0191313 | A1 | 6/2022 | Pan et al. | |
| 2022/0221910 | A1 | 7/2022 | Lee et al. | |
| 2023/0185508 | A1 | 6/2023 | Chung et al. | |

FOREIGN PATENT DOCUMENTS

| | | | |
|---|---|---|---|
| KR | 20130023623 | A | 3/2013 |
| KR | 20140075859 | A | 6/2014 |
| KR | 20140089183 | A | 7/2014 |
| KR | 102166831 | B1 | 10/2020 |
| KR | 20200122076 | A | 10/2020 |
| KR | 102188266 | B1 | 12/2020 |
| KR | 20210081107 | A | 7/2021 |
| KR | 20220017244 | A | 2/2022 |

OTHER PUBLICATIONS

The extended European search report for EP Application No. 23860771.7 mailed on Jul. 15, 2025.

* cited by examiner (a)

(b)

ELECTRONIC DEVICE FOR CONTROLLING DISPLAY CORRESPONDING TO DIRECTION OF EXTERNAL ELECTRONIC DEVICE, OPERATION METHOD THEREOF, AND STORAGE MEDIUM

CROSS-REFERENCE TO RELATED APPLICATIONS

This application is a continuation application of U.S. patent application Ser. No. 18/457,336, filed on Aug. 29, 2023, which is a continuation application of International Application No. PCT/KR2023/012515, filed on Aug. 23, 2023, which claims priority to Korean Patent Application No. 10-2022-0108896, filed on Aug. 30, 2022, in the Korean Intellectual Property Office, and which claims priority to Korean Patent Application No. 10-2022-0130825, filed on Oct. 12, 2022, in the Korean Intellectual Property Office, the disclosures of which are incorporated by reference herein in their entireties.

TECHNICAL FIELD

An embodiment of the disclosure relates to an electronic device for controlling a display corresponding to the direction of an external electronic device, an operation method thereof, and a storage medium.

BACKGROUND ART

Various types of flexible electronic devices have been developed thanks to the development of electronic technology. Such a flexible electronic device may secure portability while providing a larger display. For example, as the flexible electronic device is transformable by the user applying force, it may provide a foldable, bendable, or rollable display.

An electronic device including a folding-type flexible display may display a screen on the displays (or display areas) in various sizes. For example, when an electronic device folds in in half, the user may view the screen (e.g., content screen) in a hand-free state. In the folded state, the screen may be displayed only through the internal display of the electronic device or, for a specific application (e.g., camera application), the screen may be displayed through the external display by user settings. However, an electronic device including a plurality of foldable displays may display content in various display areas. Therefore, if the display is switched adaptively depending on the user's position to display content, the usability of the electronic device may be increased.

DISCLOSURE

Means to Address the Problems

According to an embodiment, an electronic device 101 includes a first display 260, a second display 261 disposed in a direction opposite to the first display, a memory (130 or 530), and at least one processor 120 or 520. According to an embodiment, the memory storing instructions, which when executed by the electronic device, cause the electronic device to output content through the first display. According to an embodiment, the instructions are configured to cause the electronic device to identify a direction of an external electronic device connected to the electronic device through short-range communication scheme with respect to the electronic device while outputting the content. According to an embodiment, the instructions are configured to cause the electronic device to, in response to identifying that the direction of the external electronic device is within a first range of directions, keep outputting the content through the first display, and in response to identifying that the direction of the external electronic device is within a second range of directions, output the content through the second display.

According to an embodiment, a method for controlling a display corresponding to a direction of an external electronic device by an electronic device includes: outputting content through a first display of the electronic device. According to an embodiment, the method may comprise identifying a direction of the external electronic device connected to the electronic device through short-range communication scheme with respect to the electronic device while outputting the content. According to an embodiment, the method may comprise, in response to identifying that the direction of the external electronic device is within a first range of directions, keeping outputting the content through the first display. According to an embodiment, the method may comprise, in response to identifying that the direction of the external electronic device is within a second range of directions, outputting the content through a second display disposed in a direction opposite to the first display.

According to an embodiment, a non-volatile storage medium stores instructions configured to, when executed by at least one processor 120 or 520 of an electronic device 101, enable the electronic device to perform at least one operation. The at least one operation includes outputting an content through a first display of the electronic device, identifying a direction of an external electronic device connected to the electronic device through short-range communication scheme with respect to the electronic device while outputting the content, in response to identifying that the direction of the external electronic device is within a first range of directions, keeping outputting the content through the first display, and in response to identifying that the direction of the external electronic device is within a second range of directions, outputting the content through a second display disposed in a direction opposite to the first display.

According to an embodiment, an electronic device 101 includes a short-range communication circuitry, a display (260), a UWB circuitry, a memory (130 or 530), and at least one processor (120 or 520). According to an embodiment, the memory storing instructions, which when executed by the at least one processor, cause the electronic device to control the short-range communication circuitry to establish a communication link with an external electronic device. According to an embodiment, the instructions are configured to cause the electronic device to control the UWB circuitry to perform a ranging operation to obtain information relating to a distance and a direction of the external electronic device in relation to the electronic device. According to an embodiment, the instructions are configured to cause the electronic device to, while the external electronic device is within a ranging distance of the UWB circuitry, control the display to perform a first operation based on the direction of the external electronic device being within a defined direction range. According to an embodiment, the instructions are configured to cause the electronic device to, while the external electronic device is within the ranging distance of the UWB circuitry, control the display to perform a second operation based on the direction of the external electronic device being outside the defined direction range.

BRIEF DESCRIPTION OF THE DRAWINGS

The same or similar reference denotations may be used to refer to the same or similar elements throughout the specification and the drawings.

MODE for INVENTION

Figure 1:
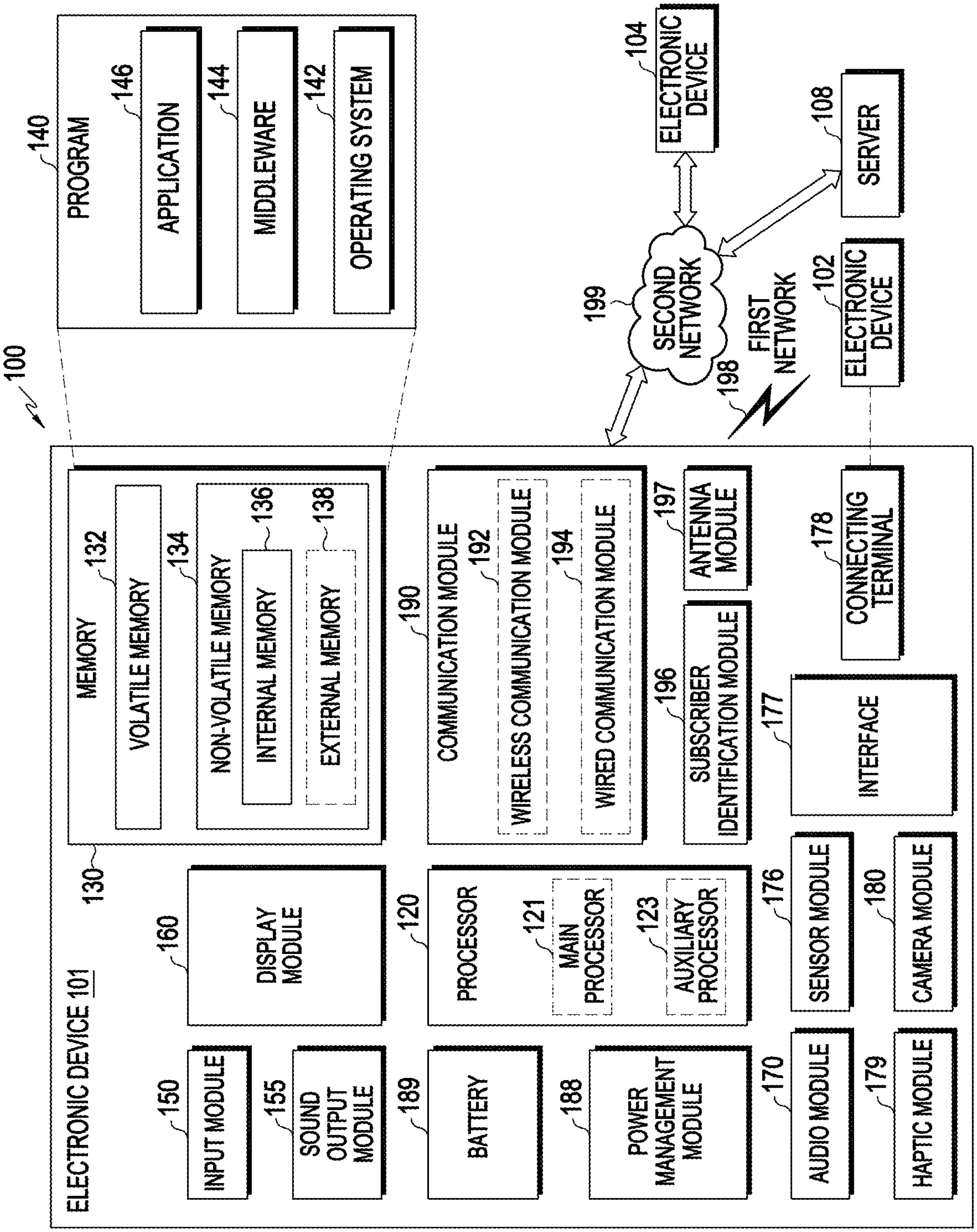
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
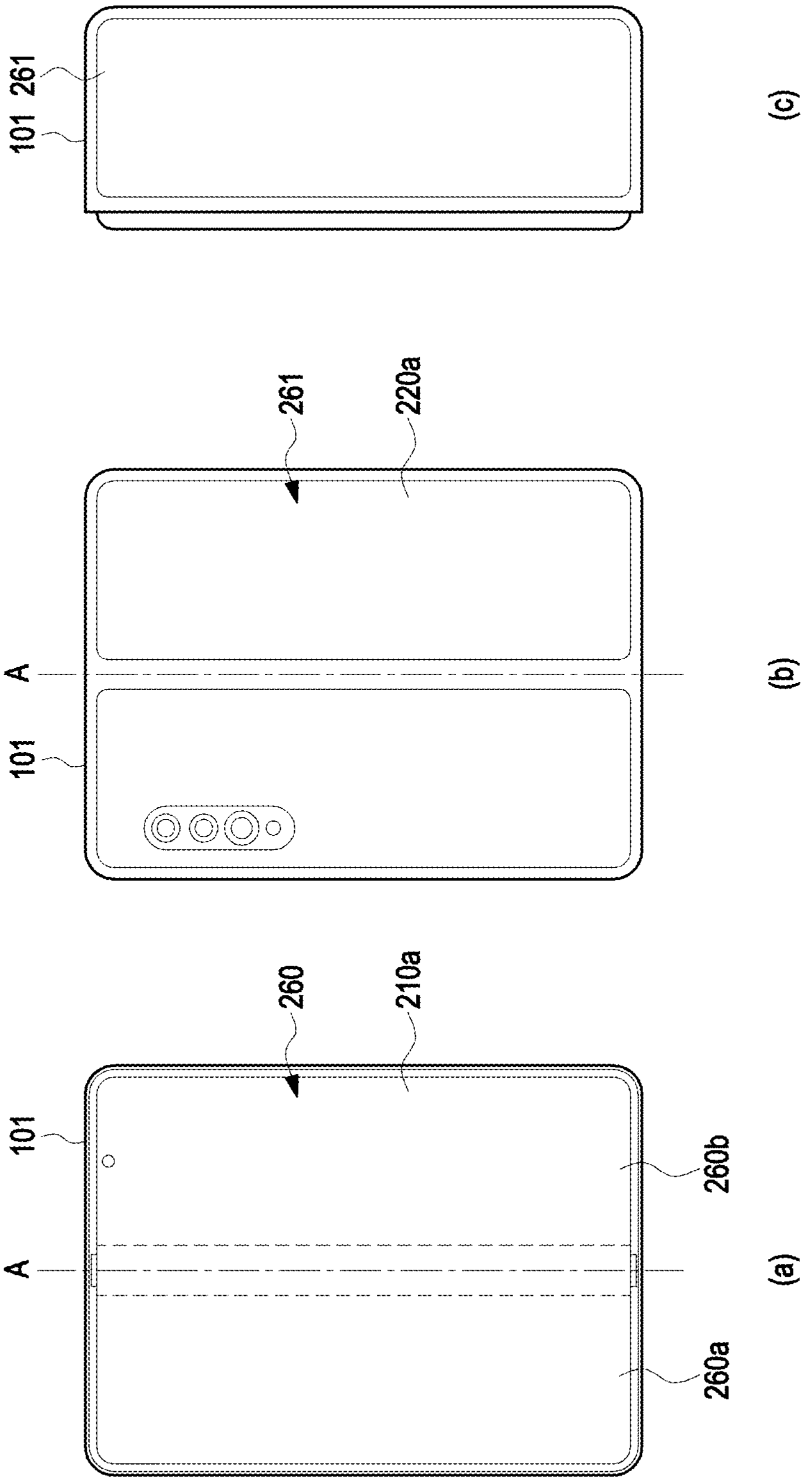
FIG. 2 is a view illustrating an unfolded state and a folded state of an electronic device according to an embodiment.

FIG. 2 is a view illustrating an unfolded state and a folded state of an electronic device according to an embodiment.

Referring to FIG. 2, in an embodiment, an electronic device 101 may include a foldable housing and a flexible or foldable display 260 disposed in a space formed by the foldable housing. The foldable housing may have a substantially symmetrical shape about a folding axis (e.g., axis A). According to an embodiment, the surface where a first flexible display 260 is disposed may be defined as a first surface 210*a* of the electronic device 101, and the surface opposite to the first surface 210*a* may be defined as a second surface 220*a*. Here, the surface where the first display 260 is disposed may be defined as a first surface 210*a* or a front surface of the electronic device 101, and the surface opposite to the front surface may be defined as a second surface 220*a* or a rear surface of the electronic device 101.

As shown in (a) of FIG. 2, the first display 260 may be formed to occupy the entire first surface 210*a* of the electronic device 101 and, as shown in (b) of FIG. 2, the second display 261 may be formed to occupy at least a portion of the second surface 220*a*. In this case, the first display 260 may pivot through a separate hinge module, and the second display 261 may be fixed to the housing. For example, the hinge structure may be configured to be folded or unfolded inward or outward. For example, a free stop hinge may maintain the folded state (i.e., completely folded state) of the electronic device 101 at various angles.

For example, the second display 261 may be disposed on any one of a pair of housings disposed on two opposite sides with respect to a folding axis (e.g., axis A). According to an embodiment, the first display 260 may mean a flexible display at least a portion of which may be transformed into a flat or curved surface. The first display 260 may include a first area (or first display area) 260*a* disposed on one side of the folding axis (e.g., axis A) and a second area (or second display area) 260*b* disposed on the opposite side of the folding axis.

For example, when the electronic device 101 is in an unfolded state (e.g., a flat state), the surface of the first display area 260*a* and the surface of the second display area 260*b* may form 180 degrees therebetween and face in the same direction (e.g., the forward direction of the electronic device 101).

As shown in (c) of FIG. 2, when the electronic device 101 is in a folded state (i.e., completely folded state), the surface of the first display area 260*a* and the surface of the second display area 260*b* of the first display 260 may face each other while forming a narrow angle (e.g., an angle between 0 and 10 degrees) therebetween. According to an embodiment, in the folded state (i.e., completely folded state) of the electronic device 101, the second display 261 may be disposed on any one of the pair of housings disposed on two opposite sides of the folding axis (e.g., axis A), but this is an example, and the second display 261 may configure most of the rear surface 220*a* depending on the structure or function in another embodiment. For example, the electronic device 101 may include the second display 261 at least a portion of which is visually exposed through the rear cover. Accordingly, it should be noted that the size and shape of the first display 260 and the second display 261 are not limited thereto. Further, the segmentation of the first display 260 as shown in (a) of FIG. 2 is merely an example, and the first display 260 may be divided into a plurality of (e.g., four or more, or two) areas depending on the structure or function.

Figure 3:
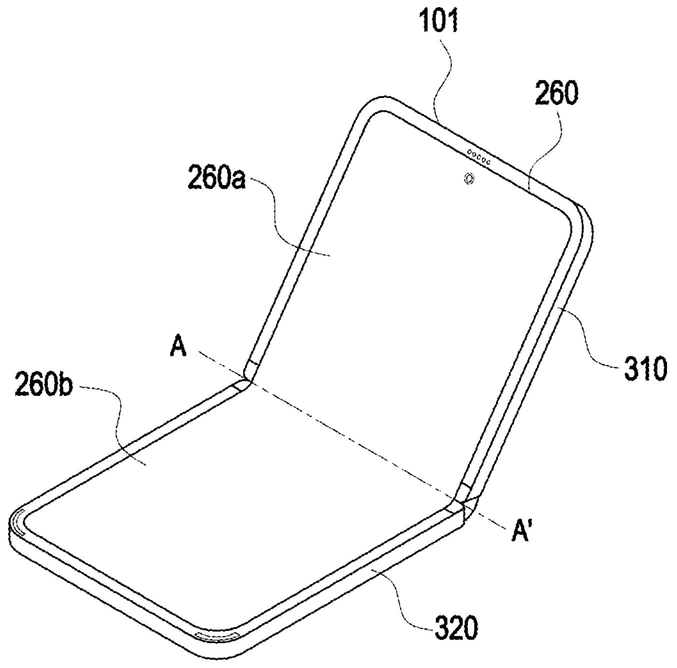
FIG. 3 is a view illustrating a partially folded state of an electronic device according to an embodiment.

FIG. 3 is a view illustrating a partially folded state of an electronic device according to an embodiment.

As shown in FIG. 3, the electronic device 101 may have a partially unfolded state based on the folding axis (e.g., A-A'). The electronic device 101 may have a state in which the second housing structure 310 is upright on a contact surface (e.g., floor or table) with the first housing structure 320 contacting the contact surface. As such, the electronic device 101 including a flexible display may fold or bent about one axis. According to an embodiment, in a partially folded state of the electronic device 101, the first display 260 may be divided into a first display area 260*a* and a second display area 260*b* vertically with respect to the folding axis. The first display area 260*a* corresponding to the upper side of the folding axis viewed by the user may be referred to as an upper area of the first display 260 (or internal display), and the second display area 260*b* corresponding to the lower side may be referred to as a lower area of the first display 260 (or internal display). At least one of the first display area 260*a* or the second display area 260*b* may include a front camera.

Figure 4:
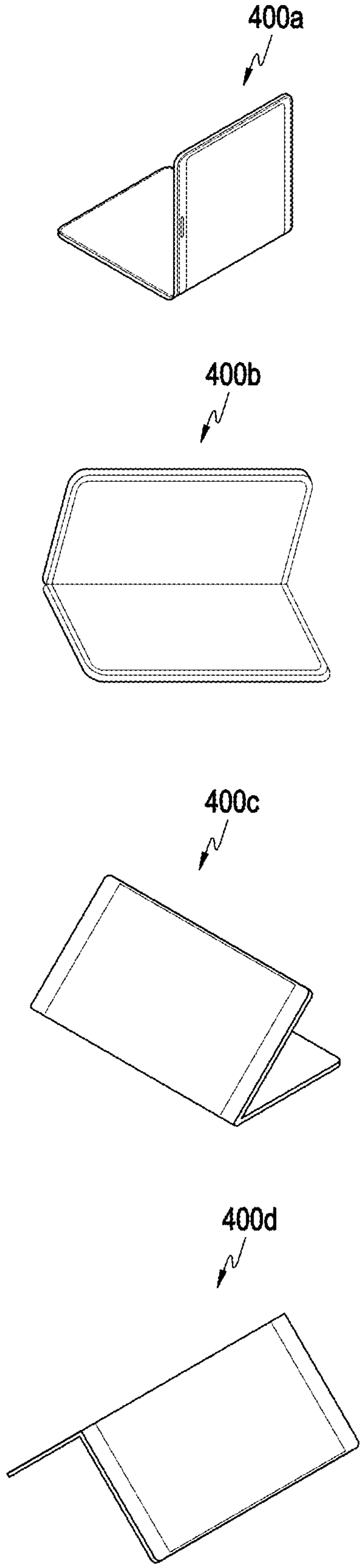
FIG. 4 is a perspective view illustrating various states of an electronic device according to an embodiment.

If the electronic device 101 shown in FIG. 3 becomes a state in which the first display 260 is partially folded, the display or display area shown to the user may be varied depending on the mounting state (or pose) as shown in 4. FIG. 4 is a perspective view illustrating various partially folded states of an electronic device according to an embodiment.

The electronic device 101 may have various partially folded states 400*a*, 400*b*, 400*c*, and 400*d* as shown in 4. The electronic device 101 may have a state in which it stands while folding in in half like a compact shape. According to an embodiment, if the electronic device 101 is a state (or pose) as shown in 400*a* to 400*c* of FIG. 4, an on state may be maintained for at least one area (or one surface) of the first display (e.g., 260 of FIG. 2), and the second display (e.g., 261 of FIG. 2) may be turned off. In other words, in the partially folded state, either the first display or the second display may be in an on state, while the other may be in an off state. Further, according to an embodiment, as the electronic device 101 supports the surface where an angle is formed between the first housing structure (e.g., 320 of FIG. 3) and the second housing structure (e.g., 310 of FIG. 3) so that the side surfaces of the main bodies contact as shown in 400*d* of FIG. 4, an on state may be maintained for one area (or one surface) of the display, and the other area (or the other surface) may be turned off in the standing state 400*d* of the electronic device 101.

As described above, in a state in which the first display 260 is partially folded to separate the first display area (e.g., 260*a* of FIG. 3) and the second display area e.g., 260*b* of FIG. 3), the area exposed to the user, of the first display area and second display area, may be varied depending on the mounting state of the electronic device 101. Further, in the case of an electronic device 101 including a plurality of displays as shown in FIG. 2, the display exposed to the user, of the first display 260 and the second display 261, may be varied as well. Accordingly, if the display outputting images is determined according to the user's position, the usability of the electronic device may be increased.

In an embodiment, when the electronic device 101 including a plurality of displays outputs an image with at least a portion of the first display 260 folded, the electronic device 101 may adaptively change the display area to correspond to the user's position by identifying the user's position. Here, the state in which the first display 260 is partially folded may be referred to as a "flex mode" distinguished from the completed folded state, and the partially folded state of the electronic device 101 may be maintained at various angles.

In this case, as the folding rate of the electronic device, the electronic device may be folded in half with respect to the middle of the electronic device, but the folding rate about the axis may also be implemented to differ.

Here, one axis may be preset or an arbitrary one. The axis being preset may mean that only a specific area (e.g., a partial area including the axis) of the flexible display of the electronic device 101 is bendable. On the other hand, the axis being arbitrary may mean that the entire area of the display of the electronic device 101 is bendable. Although FIGS. 2 to 4 illustrate that the electronic device 101 is folded in half about the axis passing through the axis of the electronic device 101, it will be appreciated by one of ordinary skill in the art that the position of the axis is not limited.

Further, in the following detailed description, the 'front surface' or 'rear surface' of the electronic device 101 may be mentioned. Regardless of the relative positions (e.g., folded state or unfolded state) of the first housing structure (e.g., 320 of FIG. 3) or second housing structure (e.g., 310 of FIG. 3), the surface where the first display 260 of FIG. 2 is disposed is defined as a 'front surface of the electronic device 101,' and the surface where the second display 261 facing opposite to the surface where the first display 260 is disposed is disposed is defined as a 'rear surface of the electronic device 101.' Further, the first display 260 may be referred to as an internal display, and the second display 261 opposite to the first display 260 may be referred to as an external display. According to an embodiment, a "configuration in which the electronic device 101 includes a plurality of displays" may be mentioned and, here, the "display" may mean a flexible display. For example, the first display 260 of FIG. 2 or 3 may mean a flexible display.

In the following description, the components easy to understand from the description of the above embodiments are denoted with or without the same reference numerals and their detailed description may be skipped. According to an embodiment of the disclosure, an electronic device 101 may be implemented by selectively combining configurations of different embodiments, and the configuration of one embodiment may be replaced by the configuration of another embodiment. However, it is noted that the present invention is not limited to a specific drawing or embodiment.

Figure 5:
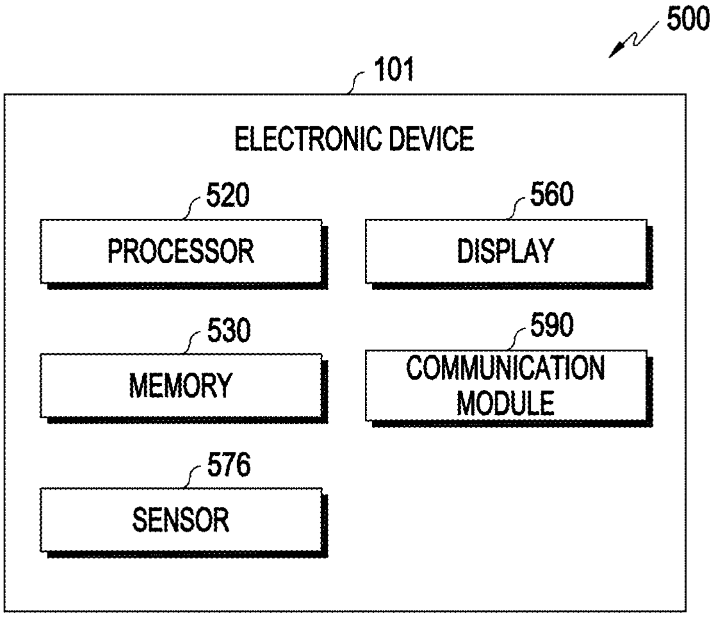
FIG. 5 is a block diagram illustrating an internal configuration of an electronic device according to an embodiment.

FIG. 5 is a block diagram 500 illustrating an internal configuration of an electronic device according to an embodiment.

Referring to FIG. 5, according to an embodiment, an electronic device 101 (e.g., the electronic device 101 of FIG. 1) may include a processor 520 (e.g., the processor 120 of FIG. 1) and a display 560 (e.g., the display module 160 of FIG. 1). According to an embodiment, the electronic device 101 (e.g., the electronic device 101 of FIG. 1) may include a memory 530 (e.g., the memory 130 of FIG. 1), a sensor 576 (e.g., the sensor module 176 of FIG. 1), and/or a communication module 590 (e.g., the communication module 190 of FIG. 1). Not all of the components of FIG. 5 are essential ones of the electronic device 101 but the electronic device 101 may be implemented with more or less than the components of FIG. 5.

The display 560 may mean a flexible display. According to an embodiment, the display 560 may include a first display 260 and a second display 261 as shown in FIG. 2. For example, the first display 260 may be divided into a first display area and a second display area as the first display 260 is partially folded. According to an embodiment, the partially folded state (e.g., flex mode) of the first display 260 may mean a state in which at least a portion of the first display 260 and at least a portion of the second display 261 each are visually exposed to the outside.

The communication module 590 may be communicatively connected with an external electronic device 102. According to an embodiment, the communication module 590 may be connected with one or more external electronic devices (e.g., 102 of FIG. 1) through a 1:1 connection or 1:n connection. Here, n is a natural number greater than 1. Further, the communication module 590 may be wirelessly connected with the external electronic device 102 in various communication schemes and, to provide a mirroring service, be connected with an external display device (e.g., TV).

According to an embodiment, the electronic device 101 may communicate with the external electronic device 102 based on a first communication scheme (e.g., a short-distance communication scheme), and identify direction of the external electronic device 102 based on a second communication scheme (e.g., a UWB communication scheme or BLE communication scheme). The communication module 590 may operate based on the first communication method and/or the second communication method.

According to an embodiment, the communication module 590 may operate based on at least one of ultra-wide band (UWB) communication schemes or Bluetooth low energy (BLE) communication schemes.

For example, the communication module 590 may include a UWB communication module. The UWB communication module may support the electronic device 101 to perform UWB communication with the external electronic device 102. The UWB communication module may measure the distance between the electronic device 101 and the external electronic device 102 through UWB communication. The UWB communication module may measure the direction (e.g., angle of arrival (AOA)) of the external electronic device 102 using a plurality of antennas.

In describing the external electronic device 102, detailed descriptions of configurations similar to those of the embodiment of FIG. 1 or easily understandable through the embodiment of FIG. 1 may be omitted.

According to an embodiment, described below is an example in which the electronic device 101 is a device outputting content, such as video, the external electronic device 102 is a wearable electronic device (e.g., wearable watch, ear wearable device, and/or head-mounted display (HMD) that may be worn (or removed) on at least a portion of the user's body, and the external display device 104 is a device, e.g., TV, which is connected with the electronic device 101 or the external electronic device 102 to output a mirroring screen corresponding to the screen output through the display of the electronic device 101, but embodiments of the disclosure are not limited thereto.

In an embodiment, an example of controlling the display of the electronic device 101 based on the direction of one external electronic device 102 with respect to the electronic device 101 in the flex mode is described, but the display may be controlled with respect to two or more external electronic devices 102. For example, when the user wears a plurality of external electronic devices 102 including a wearable watch and a head-mounted display, the processor 520 may be connected with the n external electronic devices 102 through the 1:n connection supported by the communication module 590.

In an embodiment, since the external electronic device 102, such as a head-mounted display, includes a camera (e.g., time-of-flight (ToF) camera or eye tracking camera), not only distance information with the electronic device 101 may be grasped, but also the user's gaze may be tracked.

In an embodiment, the processor 520 may obtain information related to the user's position from the n external electronic devices 102. The user position-related information may be used to identify the user's position or direction with respect to the electronic device 101. For example, the processor 520 may receive user position-related information that combines the distance information, user gaze information, user direction information, and/or user altitude information with the electronic device 101 received from the n external electronic devices 102. The processor 520 may determine the user's moving position based on the received user position-related information and perform display control corresponding to the determined user position. As such, when two or more external electronic devices are used, the accuracy for determining the user's moving position may be enhanced.

The sensor 576 may include a sensor (e.g., digital hall sensor or 9-axis sensor) for determining the operation state (e.g., unfolded state, folded state, and/or intermediate state)

and folded angle. According to an embodiment, the hall sensor may include one or more magnets and/or one or more magnetic sensors. At least one of the one or more magnets and/or the one or more magnetic sensors included in the hall sensor may be disposed in different positions in the electronic device 101. The positional relationship between the one or more magnets and/or the one or more magnetic sensors in the electronic device 101 may be varied depending on the shape of the electronic device 101. The electronic device 101 may measure a change in the positional relationship through the one or more magnetic sensors. The change in positional relationship may cause a change in the magnetic field formed by the one or more magnets. The electronic device 101 may obtain the power signal indicating the change in the magnetic field using the hall sensor. For example, the electronic device 101 may identify the state (e.g., unfolded state, folded state, and/or intermediate state) of the electronic device 101 using the power signal obtained from the hall sensor. For example, the electronic device 101 may receive data indicating the state of the electronic device 101 from the hall sensor. For example, the hall sensor may output data indicating the shape of the first display 260. The shape of the first display 260 may be changed as it is folded or unfolded by the folding axis (e.g., axis A of FIG. 2). For example, the hall sensor may output different data indicating the shape of the first display 260. The data indicating the shape of the first display 260 may include the angle of the first display 260 folded by the folding axis. For example, the electronic device 101 may identify the partially folded state (e.g., flex mode) of the first display 260 in response to identifying the angle where the angle of the first display 260 folded with respect to the folding axis is included in a designated angle range (e.g., angle range between 10° to 160° or angle range between 50° to 150°).

According to an embodiment, the sensor 576 may include a gyro sensor, an accelerometer, and/or a geomagnetic sensor for detecting the state (e.g., posture) of the electronic device 101. For example, the electronic device 101 may determine a relative azimuth to a reference azimuth using the geomagnetic sensor. The electronic device 101 may obtain the final azimuth using UWB by means of the relative azimuth to the reference azimuth and the UWB angle of arrival (AOA) using the geomagnetic sensor. The sensor 576 may be used as a 9-axis motion sensor using a gyro sensor, accelerometer, and geomagnetic sensor. In addition to the foregoing, the sensor 576 may include a strain sensor that outputs a strain value used to indirectly measure the folding angle of the electronic device 101.

The processor 520 may detect the physical state and/or a change in the physical state of the electronic device 101 based on the data received from the sensor 576. The processor 520 may detect a change (e.g., folding event or unfolding event) in operation state (e.g., unfolded state, folded state, and/or partially folded intermediate state). For example, when the angle between the first housing structure (e.g., 320 of FIG. 3) and the second housing structure (e.g., 310 of FIG. 3) corresponds to a designated angle range based on the sensor capable of detecting a change in operation state, the electronic device 101 may be determined to be in a partially unfolded (or partially folded) state.

The processor 520 may execute at least one application and visually output content corresponding to the application through the display 560. For example, the processor 520 may output the content (ex: image) played through the display 560 in response to selection of a video-related application. Here, the image (or image data) may be the result of output by the application being currently executed and may include at least one of data objects, e.g., video data, audio data, or display information, created as the application is executed. Further, the image through the display 560 may be referred to as content or may also be referred to as data, screen data, or application execution screen related to the running application.

The processor 520 may execute the application in response to a request for executing the application by the user. According to an embodiment, the processor 520 may display the content according to execution of the application on the display 560 in the partially folded state of the display 560. For example, the processor 520 may provide the content through any one of the plurality of displays according to the user settings.

According to an embodiment, the processor 520 may change the display to output the content according to the user's position and provide it. Thus, the electronic device 101 may provide the content through the display viewed by the user although the user is positioned to face the front or rear surface of the electronic device 101, allowing the user to continuously view. For example, in the partially folded state of the first display 260, if the video playback application is executed by the user, the processor 520 may display the execution screen of the application through at least a partial area of the first display 260. While displaying the execution screen of the application, the processor 520 may identify the user position and, when the user is positioned on the rear side, display the execution screen of the application through at least a partial area of the second display 261. As such, as the display is switched to provide the content depending on the user position, the user may identify the content through the display in several directions even without separate manipulation.

According to an embodiment, a wearable electronic device that is wearable on the user's body portion may be used for the purpose of identifying the user direction. The wearable electronic device may be an external electronic device 102, and the electronic device 101 may be connected to the external electronic device 102 to identify the direction of the external electronic device 102. For example, the electronic device 101 and the external electronic device 102 may be devices that interwork with each other by logging in using the same user account. As such, the processor 520 may identify the direction of the external electronic device 102, determining the user's direction with respect to a position of the electronic device 101. Accordingly, the processor 520 may determine the display corresponding to the direction of the external electronic device 102 and display the execution screen of the application through the determined display.

According to an embodiment, the processor 520 may discover a nearby connectable external electronic device 102 through the communication module 590 and be connected with the external electronic device 102 based on the discovery. The processor 520 may identify whether the connected external electronic device 102 is in a state of being worn on the user's body portion. For example, it may be identified using at least one sensor whether the external electronic device 102 is worn, and the electronic device 101 may identify the worn state based on information about the wearing state transmitted from the external electronic device 102.

According to an embodiment, the processor 520 may provide the function for changing the display corresponding to the direction of the external electronic device 102 while outputting the content. The function may be activated or inactivated through the settings menu. Accordingly, when the function is set as active, the processor 520 may continuously track the direction of the external electronic device 102 while displaying the content through a partial area of the display 560.

According to an embodiment, the processor 520 may identify the direction of the external electronic device 102 with respect to the electronic device 101 based on at least one of the UWB communication scheme or BLE communication scheme of the communication module 590.

For example, a UWB communication scheme-based UWB angle of arrival (AOA) measurement scheme is a scheme that uses a time difference between a plurality of antenna signals and may identify the direction of the external electronic device 102 based on the signal received using the antenna of the communication module 590 and identify the distance from the external electronic device 102 away from the electronic device 101. For example, the electronic device 101 may further include an antenna module (e.g., UWB antenna) for identifying the direction and/or distance of the external electronic device 102. For example, the antenna module may include a plurality of antennas for measuring the direction and/or distance of the external electronic device 102. For example, the electronic device 101 may measure the distance and/or direction (or angle (e.g., AOA)) from the external electronic device 102 using at least two antennas among the plurality of antennas included in the antenna module. The direction of the external electronic device 102 may be expressed using an angle.

According to an embodiment, it should be understood that identifying the direction of the external electronic device 102 includes identifying the direction from the electronic device 101 toward the external electronic device 102.

According to an embodiment, the electronic device 101 may also identify the location of the external electronic device 102 based on the location of the electronic device 101. For example, coordinate values of the external electronic device 102 may be identified in a predetermined 3D coordinate system centered on the location of the electronic device 101.

According to an embodiment, the processor 520 may detect the external electronic device 102 based on the BLE communication scheme and then activate the UWB signal scanning for UWB AOA measurement. For example, if the external electronic device 102 is discovered through the BLE communication scheme, the processor 520 may activate the UWB signal scanning by transmitting information necessary for UWB communication through BLE communication. The processor 520 may be connected with the external electronic device 102 through UWB communication using the transmitted information. According to an embodiment, the processor 520 may broadcast a ranging message (e.g., ranging control message or ranging request message) to the external electronic device 102. The processor 520 may broadcast the ranging request message at a first transmission interval. The processor 520 may receive a ranging response message (e.g., response message) from the external electronic device 102 that has received the ranging request message and identify the relative position of the external electronic device 102 to the electronic device 101.

In the foregoing description, the position of the external electronic device 102 is identified using the UWB communication scheme or BLE communication scheme of the communication module 590 as an example, but may not be limited thereto. For example, the processor 520 may detect the external electronic device 102 in any one direction of the upper, lower, left, and right directions with respect to the front center axis of the electronic device 101 using the sensor 576. To that end, the sensor 576 may include at least one of an infrared sensor, an ultrasonic sensor, a motion sensor, a 3D sensor, and a vision sensor, but the type of the sensor is not limited thereto. A combination of the information sensed by at least two sensors among the sensors may be used to identify the posture (or pose), position, and direction of the external electronic device 102. Further, a camera (e.g., the camera module 180 of FIG. 1) and lidar may be used to identify the posture (or pose), position, and direction of the external electronic device 102.

Figure 6A:
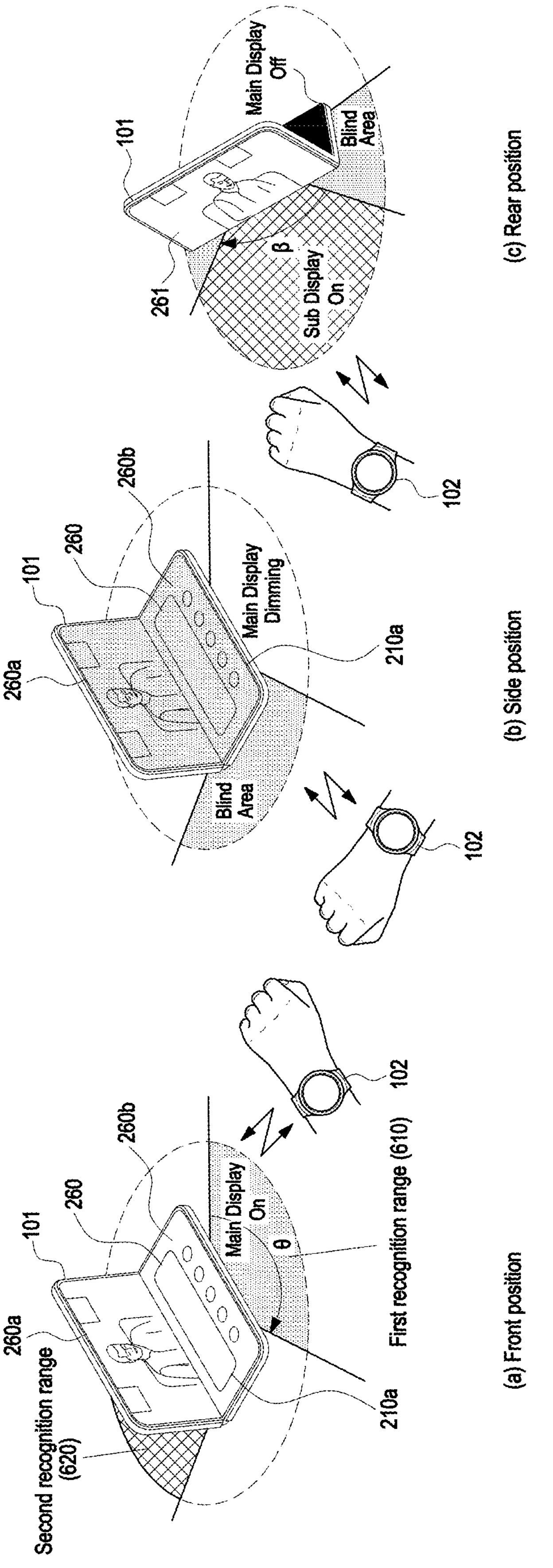
FIG. 6A is a view illustrating an example of outputting content being played through a change in the display of a first type of an electronic device depending on the position of an external electronic device according to an embodiment.
Figure 6B:
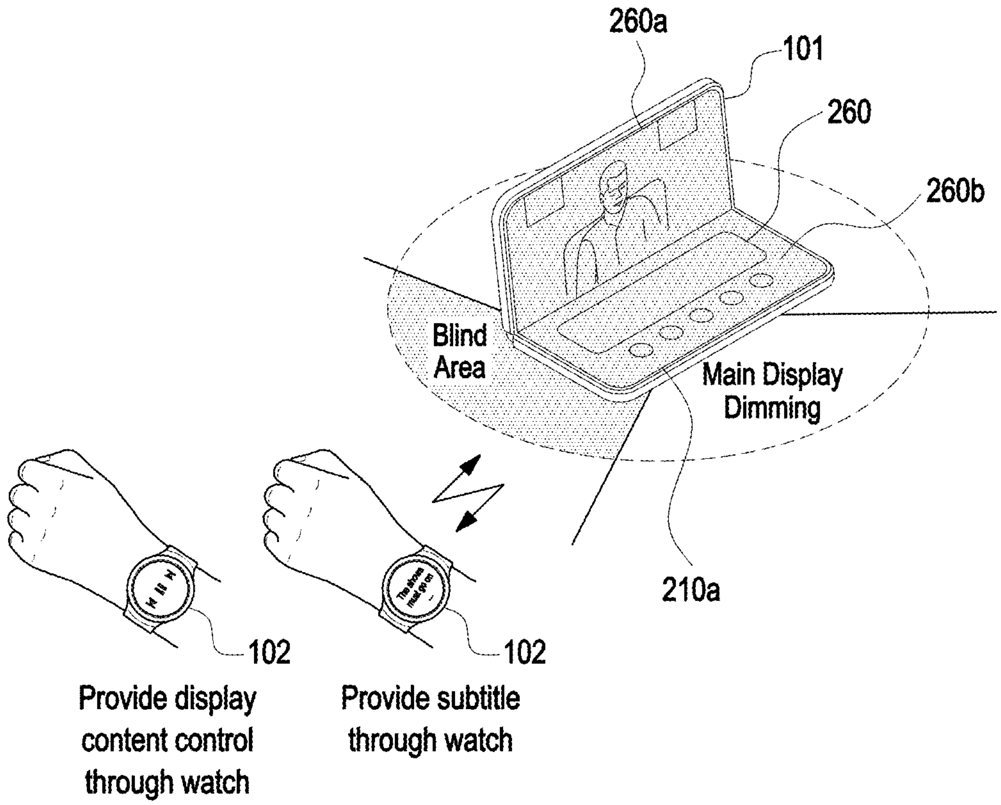
FIG. 6B is an example view illustrating a control screen in an external electronic device when the external electronic device is positioned on a side of an electronic device according to an embodiment.

The processor 520 may identify the position of the external electronic device 102 while outputting the content through the first display 260 among the plurality of displays. When the direction of the external electronic device 102 corresponds to a first range, the processor 520 may keep on outputting the content through the first display 260. On the other hand, when the direction of the external electronic device 102 corresponds to a second range of directions, the processor 520 may control to output the content through the second display 261 disposed opposite to the first display 260. Here, FIGS. 6A and 6B may be referred to define the first range of directions and the second range of directions. FIG. 6A is a view illustrating an example of outputting the content being played through a display switch by a first type of an electronic device according to the position of an external electronic device according to an embodiment. FIG. 6B is an example view illustrating a control screen in an external electronic device when the external electronic device is positioned on a side surface of an electronic device according to an embodiment. According to an embodiment, the first type of electronic device 101 may include a flexible display. The first type of electronic device 101 may have a state in which it stands while folding in in half like a compact shape.

Referring to FIG. 6A, in a partially folded state of the first display 260 of the electronic device 101, the first display area 260*a* may be the upper area, and the second display area 260*b* may be the lower area. As shown in (a) of FIG. 6A, when the external electronic device 102 is positioned on the front surface direction of the electronic device 101, the external electronic device 102 may be detected within a first recognition range 610 facing the front surface 210*a* direction of the electronic device 101. The electronic device 101 may output a content through the first display 260 (also referred to as "main display") disposed on the front surface 210*a*, in response to detection of the external electronic device 102 within the first recognition range 610. The first recognition range 610 may be referred to as a "front range". For example, when a video-related application is executed in the flex mode, the playing image may be displayed in the first display area 260*a* of the first display 260, and a control item related to control of the playing image may be displayed in the second display area 260*b*. Here, the image displayed through the first display 260 may be referred to as content (or contents) or may also be referred to as data, screen data, or application execution screen related to the running application. In an embodiment, the front range may be a predetermined azimuthal angle range (e.g., within 30 degrees) with respect to a normal direction to the first display area 260*a*.

According to an embodiment, the user wearing the external electronic device 102 may move while content is output (or displayed) through the first display 260. As shown in (b) of FIG. 6A, when the external electronic device 102 is positioned on a side range (also referred to as "blind area") of the electronic device 101, the external electronic device 102 which was detected within the first recognition range 610 may not be detected anymore. For example, when the external electronic device 102 is not detected within the first recognition range 610 in a state in which the playing image is displayed in the first display area 260*a* of the first display 260, the electronic device 101 may perform the operation of decreasing the brightness for the first display 260 (e.g., performing dimming). (b) of FIG. 6A illustrates an example of decreasing brightness as the control operation for the first display 260 when the external electronic device 102 falls outside the field of view, but the control operation for the first display 260 when falling outside the field of view may not be limited thereto.

For another example, when the external electronic device 102 is not detected within the first recognition range 610 (e.g., when the external electronic device 102 is in the blind area), a control function may be provided in relation to playback of the display content through the external electronic device 102 as shown in FIG. 6B. Accordingly, the control operation for the first display 260 may be varied according to selection of a control function through the external electronic device 102. For example, when a pause function is selected through the external electronic device 102, the electronic device 101 may stop outputting the content playing through the first display 260. Further, a subtitle for the playing content may be provided (i.e., displayed) through the external electronic device 102.

According to an embodiment, as shown in (c) of FIG. 6A, when the external electronic device 102 is positioned on the rear surface 220*a* of the electronic device 101, the external electronic device 102 may be detected within a second recognition range 620 facing the rear surface 220*a* of the electronic device 101 as the user wearing the external electronic device 102 moves. The second recognition range 620 may be referred to as a "rear range". In an embodiment, the rearrange may be a predetermined azimuthal angle range (e.g., within 30 degrees) with respect to a normal direction to the second display 261.

Referring to (c) of FIG. 6A, in the partially folded state of the first display 260 of the electronic device 101, when the user moves to the second recognition range 620 facing the rear surface 220*a*, the display exposed to the user may be varied. In other words, the user may see the second display 261 disposed on the rear surface 220*a* of the electronic device 101. For example, the playing content may be displayed on the second display 261 (also referred to as "sub display") in the direction corresponding to the position of the external electronic device 102, and the first display 260 (i.e., main display) may be turned off.

According to an embodiment, when the external electronic device 102 is detected within the second recognition range 620 as the user wearing the external electronic device 102 moves, the processor 520 may turn off at least one area (or one surface) of the first display 260 and output the content through the second display 261 corresponding to the direction of the external electronic device 102. In this case, the processor 520 may stop outputting the content through the first display 260 while simultaneously turning off at least one area (or one surface) of the first display 260 and turn on the second display 261 to output the content.

Here, the first recognition range 610 may mean a first range with respect to the upper display area 260*a* of the first display 260 in a partially folded state of the first display 260. Further, the second recognition range 620 may mean a second range with respect to the second display 261 of the electronic device 101 in the partially folded state of the first display 260, corresponding to the direction opposite to the first recognition range 610.

According to an embodiment, the processor 520 may continuously track the external electronic device 102 in an omni-directional range based on at least one of the UWB communication scheme or BLE communication scheme. However, when the user is in a position off the first recognition range 610, although the direction of the external electronic device 102 is identifiable, the user may not identify the screen content although looking at the display 560. Accordingly, the first recognition range 610 and the second recognition range 620 may be determined based on the field of view (e.g., viewing angle) in which the user recognition is possible when the user views the display 560. For example, the first recognition range 610 may correspond to the field of view with respect to the first display 260, and the second recognition range 620 may correspond to the field of view with respect to the second display 261.

According to an embodiment, the first recognition range 610 may be the field of view (e.g., within the viewing angle) of the scene captured by the front camera under the assumption that the front camera is disposed in the center of the upper display area 260*a* of the first display 260. For example, the first recognition range 610 may be a range of the screen captured as the subject (e.g., user) is viewed through the camera (e.g., front camera or rear camera), and the camera may have an angle of view in a predetermined range, and the recognition range may be varied depending on the angle of view of the camera. In an embodiment, although the angle of view of the camera is described as an example for the purpose of describing the recognition range, this is merely an example for a better understanding, and the first recognition range 610 should be understood as a field of view range recognizable when the user views the display. For example, the first recognition range 610 may be determined as a θ angle, the second recognition range 620 may be determined as a β angle, and the width of the recognition range, for example, the θ angle and the β angle may be varied as needed.

For example, the recognition range may be varied depending on the folding angle of the partially folded state (e.g., flex mode) of the first display 260. For example, for the first recognition range 610 and second recognition range 620 corresponding to the field of view for the upper display (e.g., the upper display area 260*a*), the recognition range (or recognizable range) may widen at a folding angle of 90 degrees or more with respect to the upper display area 260*a* which is folded vertically, i.e., 90 degrees and narrow at an angle of 90 degrees or less.

According to an embodiment, the processor 520 may adaptively change the target display to output (or play) the content corresponding to the direction of the external electronic device 102 among the plurality of displays. Further, the processor 520 may control the display outputting the content in various manners according to the user's repositioning. For example, when the external electronic device 102 is identified as moving off the first recognition range 610, the user may be regarded as not viewing the first display 260 any longer, and then the processor 520 may reduce the brightness of the first display 260. In this case, the content output through the first display 260 may be maintained although the brightness of the first display 260 is reduced. For example, the processor 520 may control to increase the sound volume for the output content depending on the distance where the external electronic device 102 worn by the user moves away from the electronic device 101. Further, the processor 520 may simultaneously control the brightness adjustment and volume adjustment. For example, upon identifying that the external electronic device 102 moves off the first recognition range 610, the processor 520 may control to stop the content output through the first display 260.

Thereafter, the processor 520 may turn off the first display 260 in response to detection of the external electronic device 102 outside the first recognition range 610 and inside the second recognition range 620. For example, in response to the elapse of a predetermined time after the external electronic device 102 is moved off the first recognition range 610 and detected in the second recognition range 620, the processor 520 may turn off the first display 260.

According to an embodiment, the processor 520 may control to keep outputting the content through the first display 260 even if the external electronic device 102 is detected outside the first recognition range 610 and in the second recognition range 620. For example, even if the external electronic device 102 is detected outside the first recognition range 610 and in the second recognition range 62, The processor 520 controls to output the same content through each of the first display 260 and the second display 261 so that other users who are viewing the content through the first display 260 can also view the content.

Figure 6C:
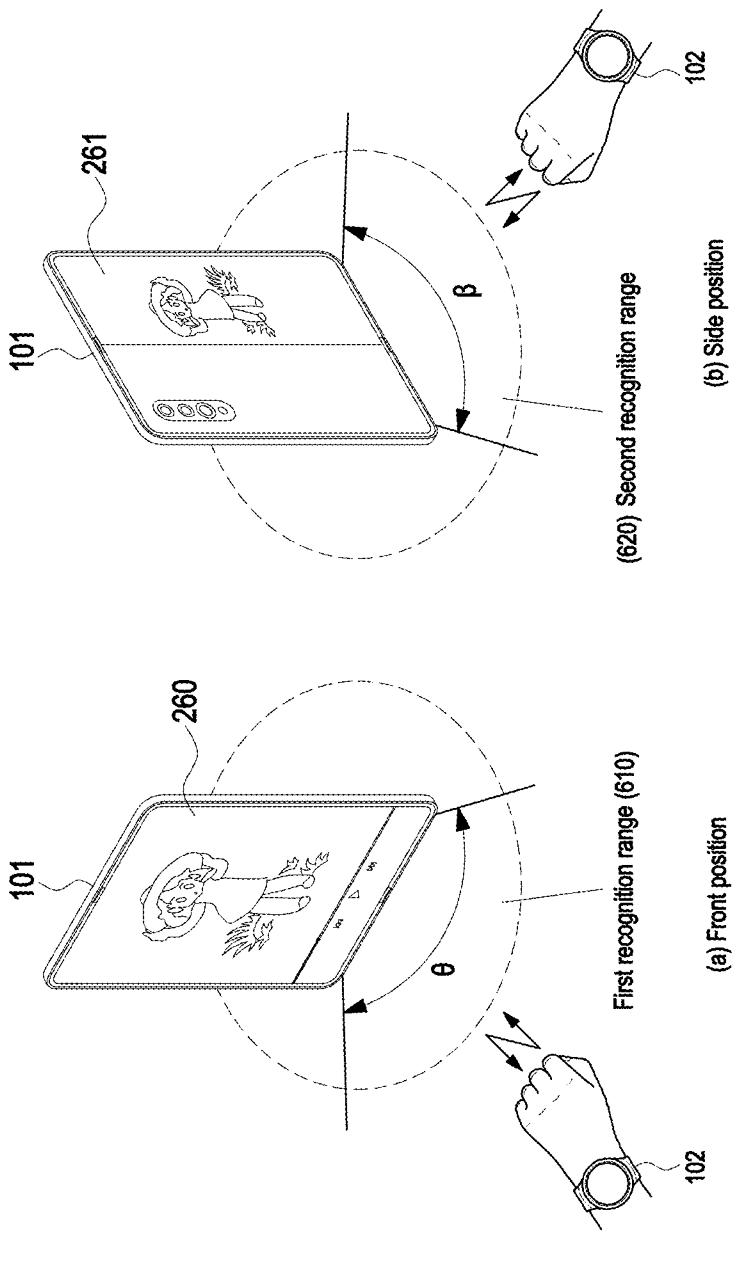
FIG. 6C is a view illustrating an example of outputting content being played through a change in the display of a second type of an electronic device depending on the position of an external electronic device according to an embodiment.

FIG. 6C is a view illustrating an example of outputting content being played through a change in the display of a second type of an electronic device depending on the direction of an external electronic device according to an embodiment.

As shown in FIG. 6C, a first display 260 of the flexible display may be formed to occupy the entire first surface of the electronic device 101, and a second display 261 of the flexible display may be formed to occupy at least a portion of the second surface. In this case, the first display 260 may pivot through a separate hinge module, and the second display 261 may be fixed to the housing.

As shown in (a) of FIG. 6C, when the electronic device 101 is detected in the first recognition range 601 in standing state, the processor 520 may output content through the first display 260. If the electronic device 101 is detected in the second recognition range 620 as shown in (b) of FIG. 6C, the processor 520 may output the content through the second display 261.

Figure 6D:
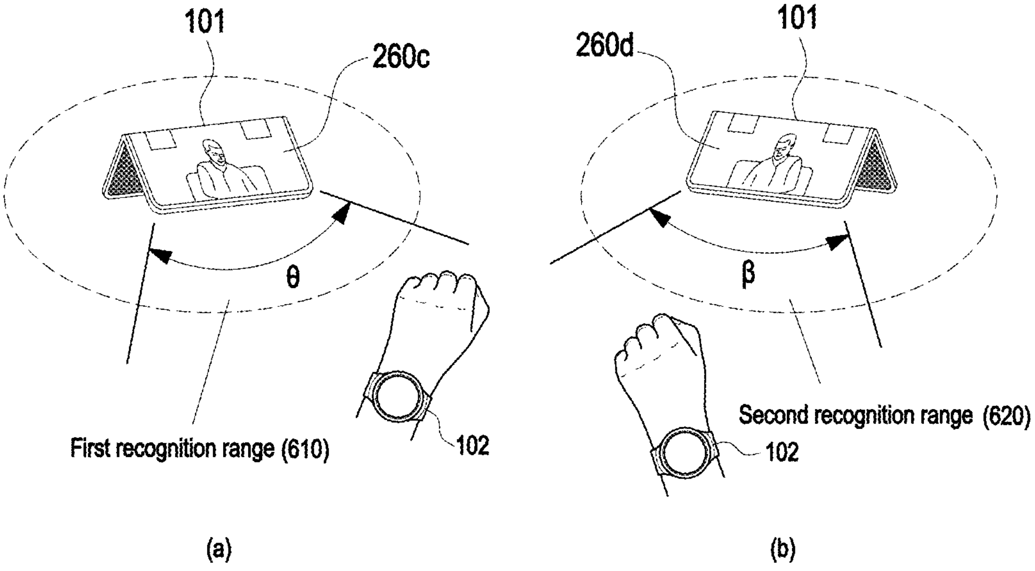
FIG. 6D is a view illustrating an example of outputting content being played through a change in the display of a third type of an electronic device depending on the position of an external electronic device according to an embodiment.

FIG. 6D is a view illustrating an example of outputting content being played through a change in the display of a third type of an electronic device depending on the direction of an external electronic device according to an embodiment As shown in (a) of FIG. 6D, when the electronic device 101 is detected in the first recognition range 601 with the first display 260 folded outward, the processor 520 may output content through a first display area 260*c* of the first display 260. If the electronic device 101 is detected in the second recognition range 620 as shown in (b) of FIG. 6D, the processor 520 may output the content through a second display area 260*d* of the first display 260.

As such, it is possible to control the display in various manners corresponding to the direction in which the external electronic device 102 is located with respect to the electronic device 101, and this is described below in detail with reference to FIGS. 8 to 16.

The memory 530 may store instructions to enable the processor 520 to perform various operations when executed. According to an embodiment, the memory 530 may be operatively connected to the display 560, the sensor 576, the communication module 590, and the processor 520 and store instructions to control to output content through the first display 260 in a partially folded state of the first display 260, identify a direction of an external electronic device 102 with respect to the electronic device 101 while outputting the content, in response to identifying that the direction of the external electronic device 102 is within a first range of directions, keep outputting (or continue to output of the content) the content through the first display 260, and in response to identifying that the direction of the external electronic device 102 is within a second range of directions, output the content through the second display 261.

According to an embodiment, an electronic device 101 includes a first display 260, a second display 261 disposed in a direction opposite to the first display, at least one processor 120, 520 and memory 130, 530 storing instructions, which when executed by the electronic device, cause the electronic device to output content through the first display. According to an embodiment, the instructions are configured to cause the electronic device to identify a direction of an external electronic device connected to the electronic device through short-range communication scheme with respect to the electronic device while outputting the content. According to an embodiment, the instructions are configured to cause the electronic device to, in response to identifying that the direction of the external electronic device is within a first range of directions, keep outputting the content through the first display, and in response to identifying that the direction of the external electronic device is within a second range of directions, output the content through the second display.

According to an embodiment, wherein as the first display is partially folded, the first display is divided into a first display area and a second display area with a folding axis therebetween, wherein the first range of directions may be a within a front range of directions with respect to the first display area, and the second range of directions may be within a rear range of directions opposite to the first range of directions.

According to an embodiment, the instructions are configured to cause the electronic device to, in response to identifying that of the external electronic device falls outside the first range of directions while keeping outputting the content through the first display, identify whether the direction of the external electronic device is within the second range of directions, and in response to identifying that of the external electronic device is within the second range of directions, output the content through the second display.

According to an embodiment, the instructions are configured to cause the electronic device to identify whether the direction of the external electronic device falls outside the first range of directions while keeping outputting the content through the first display, and in response to identifying that the direction of the external electronic device falls outside the first range of directions, reduce a brightness of the first display.

According to an embodiment, the instructions are configured to cause the electronic device to, in response to identifying that of the external electronic device falls outside the first range of directions, and outside the second range of directions, control the external electronic device to output guide information about the content being output while keeping outputting the content through the first display. The guide information may include at least one of a subtitle representing the content being output, playback time information about the content being output, or whether to stop playing the content being output.

According to an embodiment, the instructions are configured to cause the electronic device to, in response to identifying that of the external electronic device falls outside the first range of directions, identify the direction of the external electronic device with respect to the electronic device, and in response to identifying that the identified direction of the external electronic device is within the second range of directions after a predetermined time, provide a guide related to a playback timing of the content to be output through the second display.

According to an embodiment, the instructions are configured to cause the electronic device to identify the direction of the external electronic device with respect to the electronic device, based on at least one of an ultra-wide band (UWB) communication scheme or a Bluetooth low energy (BLE) communication scheme.

According to an embodiment, the instructions are configured to cause the electronic device to identify a connection with the external electronic device and identify whether the connected external electronic device is worn on a user's body portion and identify the direction of the external electronic device with respect to the electronic device.

According to an embodiment, the instructions are configured to cause the electronic device to, in response to a distance of the external electronic device from the electronic device being a predetermined distance or more, in response to identifying the external display device, identify an external display device for mirroring the content, and output the image through the external display device.

According to an embodiment, as the first display is partially folded, the first display may be divided into a first display area and a second display area with a folding axis therebetween, and the instructions are configured to cause the electronic device to identify a height of the external electronic device with respect to the electronic device, and in response to the direction of the external electronic device being within the first range of directions and the height of the external electronic device, determine one of the first display area and the second display area to output the content.

According to an embodiment, an electronic device 101 includes a short-range communication circuitry, a display (260), a UWB circuitry, a memory (130 or 530), and at least one processor (120 or 520). According to an embodiment, the memory storing instructions, which when executed by the at least one processor, cause the electronic device to control the short-range communication circuitry to establish a communication link with an external electronic device. According to an embodiment, the instructions are configured to cause the electronic device to control the UWB circuitry to perform a ranging operation to obtain information relating to a distance and a direction of the external electronic device in relation to the electronic device. According to an embodiment, the instructions are configured to cause the electronic device to, while the external electronic device is within a ranging distance of the UWB circuitry, control the display to perform a first operation based on the direction of the external electronic device being within a defined direction range. According to an embodiment, the instructions are configured to cause the electronic device to, while the external electronic device is within the ranging distance of the UWB circuitry, control the display to perform a second operation based on the direction of the external electronic device being outside the defined direction range.

Figure 7:
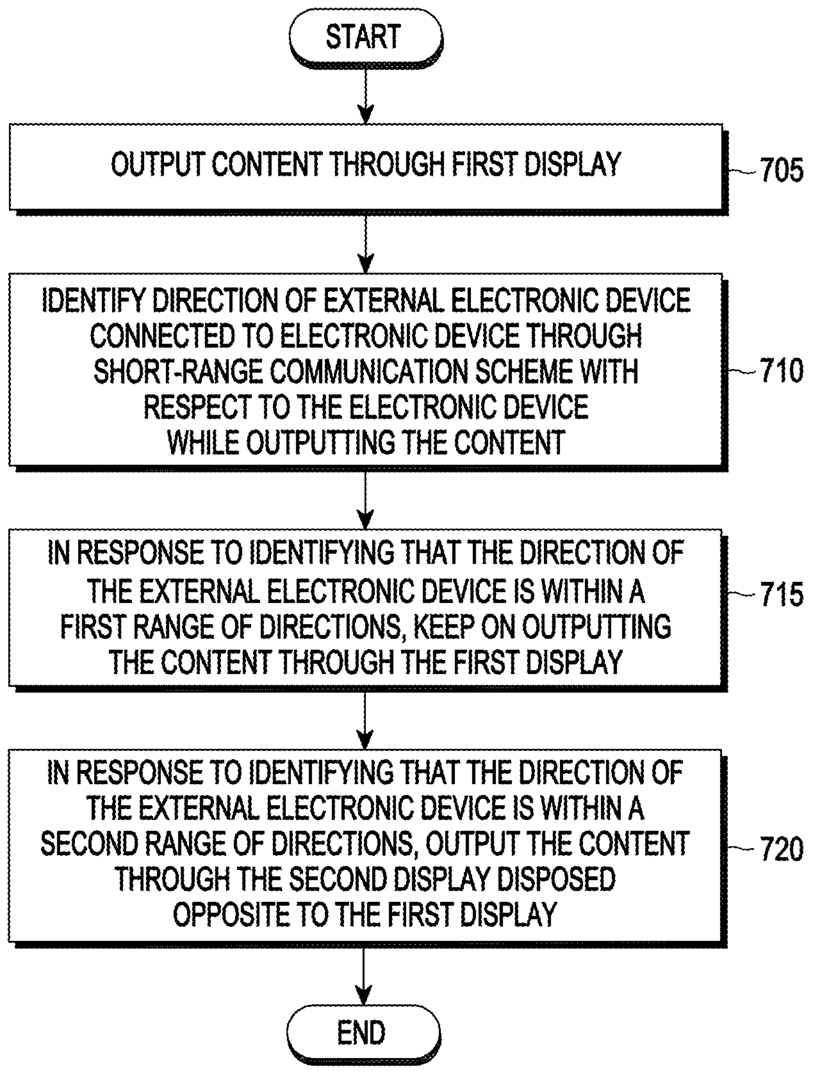
FIG. 7 is a flowchart illustrating operations of an electronic device according to an embodiment.

FIG. 7 is a flowchart illustrating operations of an electronic device according to an embodiment. Referring to FIG. 7, the operation method may include operations 705 to 720. Each operation of the operation method of FIG. 7 may be performed by an electronic device (e.g., at least one electronic device 101 of FIGS. 1 to 6B or at least one processor (e.g., the processor 120 of FIG. 1 or the processor 520 of FIG. 2) of the electronic device). In an embodiment, at least one of operations 705 to 720 may be omitted or changed in order or may add other operations.

In operation 705, the electronic device 101 may output content through the first display 260. According to an embodiment, the electronic device 101 may display the execution screen of an application through the first display 260. For example, the application may include a video playback application, but is not limited thereto.

In operation 710, the electronic device 101 may identify the direction of the external electronic device 102 connected to the electronic device through short-range communication scheme with respect to the electronic device 101 while outputting the content. According to an embodiment, the electronic device 101 may identify connection with the external electronic device 102 and identify whether the connected external electronic device 102 is worn on the user's body portion. The electronic device 101 may identify the direction of the external electronic device 102 with respect to the electronic device 101 based on the external electronic device 102 identified as worn.

According to an embodiment, the electronic device 101 may identify the direction and/or a distance of the external electronic device 102 with respect to the electronic device 101 based on at least one of the UWB communication scheme or BLE communication scheme.

In operation 715, in response to identifying that the direction of the external electronic device 102 is within a first range of directions, the electronic device 101 may keep on outputting the content through the first display 260. For example, upon determining that the user wearing the external electronic device 102 is positioned in the first range of directions (e.g., the first recognition range 610 of FIGS. 6A and 6B), the electronic device 101 may continuously output the content through at least a partial display area of the first display 260. Here, the content play screen may be displayed through the first display area 260*a* (or upper display area), and the control screen related to content play may be displayed through the second display area 260*b* (or lower display area).

In operation 720, in response to identifying that the direction of the external electronic device 102 is within a second range of directions, the electronic device 101 may output the content through the second display 261 disposed opposite to the first display 260. For example, upon determining that the user wearing the external electronic device 102 is positioned in the second range of directions (e.g., the second recognition range 620 of FIGS. 6A and 6B), the electronic device 101 may output the content, which used to be displayed through the first display 260, on the second display 261. Accordingly, the content play screen may be displayed through at least a partial area of the second display 261.

According to an embodiment, the aspect ratios of the first display 260 and the second display 261 may differ from each other. Therefore, the electronic device 101 may change (or optimize) the aspect ratio (e.g., horizontal-vertical ratio) of the playing content to correspond to the display aspect ratio corresponding to the output target when outputting the content on the first display 260 or the second display 261, as the user moves.

According to an embodiment, wherein as the first display is partially folded, the first display is divided into a first display area and a second display area with a folding axis therebetween, and the first range of directions may is within a front range of directions with respect to the first display area, and the second range of directions is within a rear range of directions opposite to the front range.

According to an embodiment, the electronic device 101 may identify a recognition range (e.g., the first recognition range 610 or second recognition range 620) using the position of the external electronic device 102 and the direction of the external electronic device 102 with respect to the electronic device 101. According to an embodiment, the electronic device 101 may identify the recognition range (e.g., the first recognition range 610 or second recognition range 620) using the position of the external electronic device 102. According to an embodiment, the electronic device 101 may identify the recognition range (e.g., the first recognition range 610 or second recognition range 620) using the direction of the external electronic device 102 with respect to the electronic device 101.

According to an embodiment, when the direction of the external electronic device 102 falls outside the first range of directions while keep outputting the content through the first display 260, the electronic device 101 may identify whether the direction of the external electronic device 102 is within the second range of directions. For example, when the external electronic device 102 worn on the user's body portion falls outside the first range of directions (e.g., the first recognition range 610) as shown in (b) or (c) of FIG. 6A, the electronic device 101 may identify whether it is detected in the second range of directions (e.g., the second recognition range 620).

According to an embodiment, the electronic device 101 may identify whether the direction of the external electronic device 102 falls outside the first range of directions while keep outputting the content through the first display 260 and, if falling outside the first range of directions, reduce the brightness of the first display 260. For example, when falling outside the first range of directions, the electronic device 101 may regard the user as not facing and viewing the first display 260 any longer, and reduce the brightness of the first display 260 to save battery.

According to an embodiment, in response to identifying that the direction of the external electronic device 102 is within the second range of directions, the electronic device 101 may output the content through the second display 261. For example, the electronic device 101 may output the content, which used to be output through the first display 260, on the second display 261.

According to an embodiment, in response to identifying that the direction of the external electronic device 102 falls outside the first range of directions and does not correspond to the second range of directions, the electronic device 101 may control the external electronic device 102 to output guide information about the content being output, while keep outputting the content through the first display 260 is maintained.

According to an embodiment, the guide information may include at least one of the subtitle showing the content being output, playtime information about the content being output, or whether to pause the playback of the content being output (See FIG. 6B).

For example, the electronic device 101 may continuously output the sound for the content being output although reducing the brightness of the first display 260 to save battery in a state in which the direction of the external electronic device 102 falls outside the first range of directions. Further, in a state in which the content including a subtitle is being output, the guide information (e.g., subtitle information) about the content being output may be transferred to the external electronic device 102 from the electronic device 101. Accordingly, the external electronic device 102 may output (or display) the guide information about the content being output on the electronic device 101 through the screen or as voice, allowing the user to identify the content even without viewing the first display 260. Further, by receiving the guide information, the external electronic device 102 may display the playback time information about the content being output. Accordingly, the user may identify the part being played of the entire content as well as the playback speed even without viewing the first display 260. Further, when the direction of the external electronic device 102 falls outside the first range of directions and is not within the second range of directions, the electronic device 101 may regard it as a state in which the user cannot see the content and, based on reception of the guide information from the electronic device 101, the external electronic device 102 may display items for selecting whether to stop playing the content being output (See FIG. 6B).

According to an embodiment, if the direction of the external electronic device 102 falls outside the first range of directions, the electronic device 101 may identify the direction of the external electronic device 102 with respect to the electronic device 101 and, when the identified direction of the external electronic device 102 is within the second range of directions after a predetermined time, the electronic device 101 may provide a guide related to the playback timing of the content to be output through the second display 261.

For example, a predetermined time (e.g., three seconds) after the direction of the external electronic device 102 falls outside the first range of directions, the electronic device 101 may reduce the brightness of the first display 260 to save battery and transfer guide information (e.g., subtitle information corresponding to currently played part of the video) about the content being output on the external electronic device 102. If the external electronic device 102 is detected in the second range of directions after a predetermined time (e.g., 30 seconds), the electronic device 101 may output the image, which used to be output through the first display 260, on the second display 261 of the electronic device 101. Further, when the external electronic device 102 is again detected in the first range of directions after another predetermined time, the electronic device 101 may change the brightness of the first display 260 back to the previous brightness. Further, in another embodiment, the electronic device 101 may provide a guide related to the playback timing of the content to be output through the second display 261, considering the state in which the user is unable to see the content through the first display 260 due to her movement from the front range facing the front surface **210*a* into the rear range facing the rear surface 220*a*. For example, the electronic device 101 may provide the user with a function for again identifying (or viewing) the content from the timing when falling outside the first range of directions so that the user may watch the content again through the second display 261 from the part of the content displayed on the first display 260** when falling outside the first range of directions.

According to an embodiment, the electronic device 101 may identify the direction and/or distance of the external electronic device 102 with respect to the electronic device 101 continuously or periodically while outputting the content. For example, the electronic device 101 may identify whether the distance of the external electronic device 102 from the electronic device 101 is a predetermined distance or more. If the distance of the external electronic device 102 from the electronic device 101 is equal to or greater than the predetermined distance, the electronic device 101 may identify another external display device (e.g., 104 of FIG. 1) near the external electronic device 102 worn by the user for mirroring the content to the external display device 104. The electronic device 101 may control to output the image through the external display device 104 in response to identifying the external display device 104 so that the user may watch the image again through the external display device 104 from the part of the content displayed on the electronic device 101 when the distance of the external electronic device 102 from the electronic device 101 increases to the predetermined distance.

Figure 8:
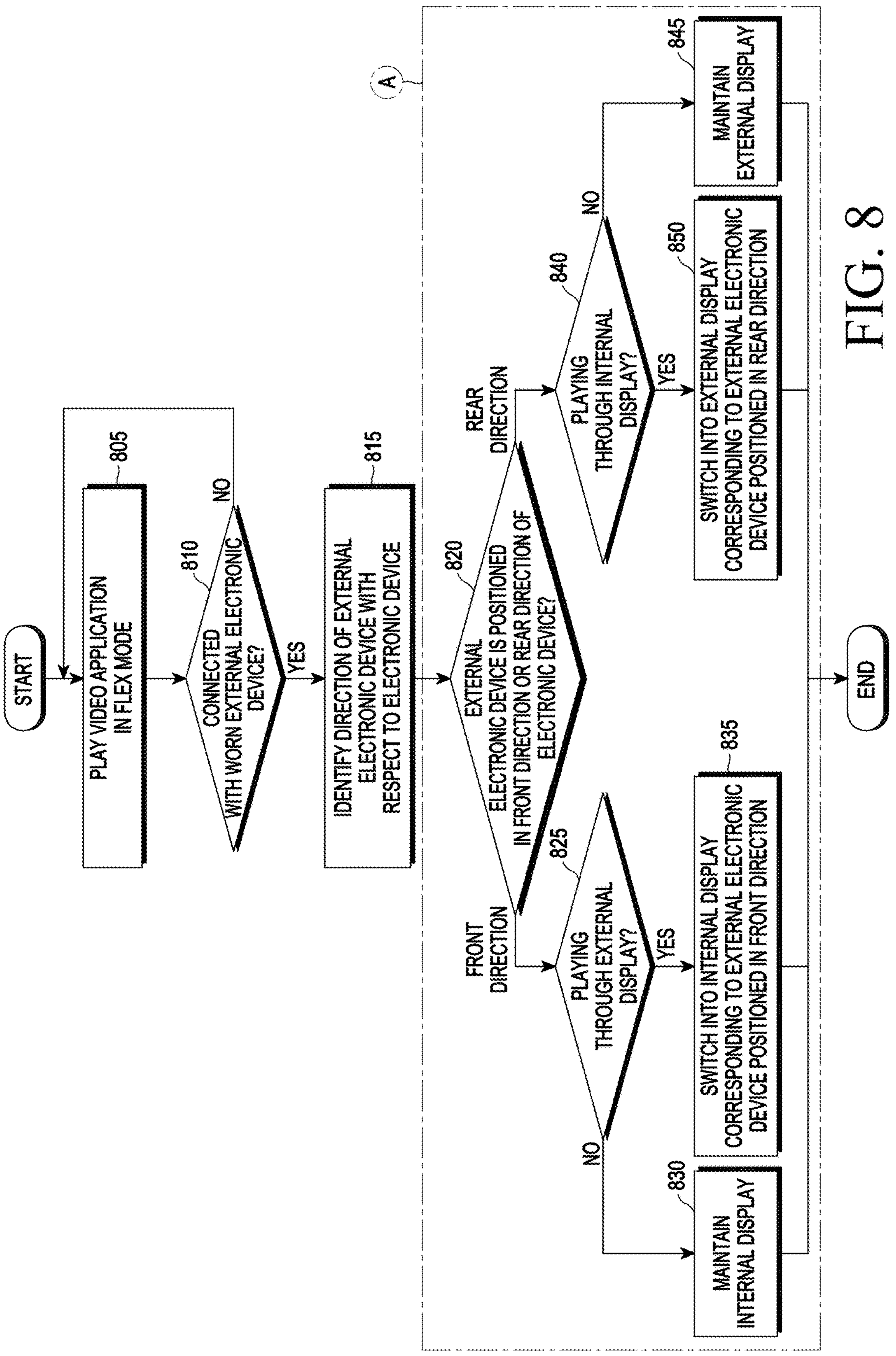
FIG. 8 is a flowchart illustrating operations of an electronic device for controlling a display corresponding to a position of an external electronic device according to an embodiment.

FIG. 8 is a flowchart illustrating operations of an electronic device for controlling a display corresponding to a position of an external electronic device according to an embodiment. Referring to FIG. 8, the operation method may include operations 805 to 850. Each operation of the operation method of FIG. 8 may be performed by an electronic device (e.g., at least one electronic device 101 of FIGS. 1 to 6B or at least one processor (e.g., the processor 120 of FIG. 1 or the processor 520 of FIG. 2) of the electronic device). In an embodiment, at least one of operations 805 to 850 may be omitted or changed in order or may add other operations.

Figure 9A:
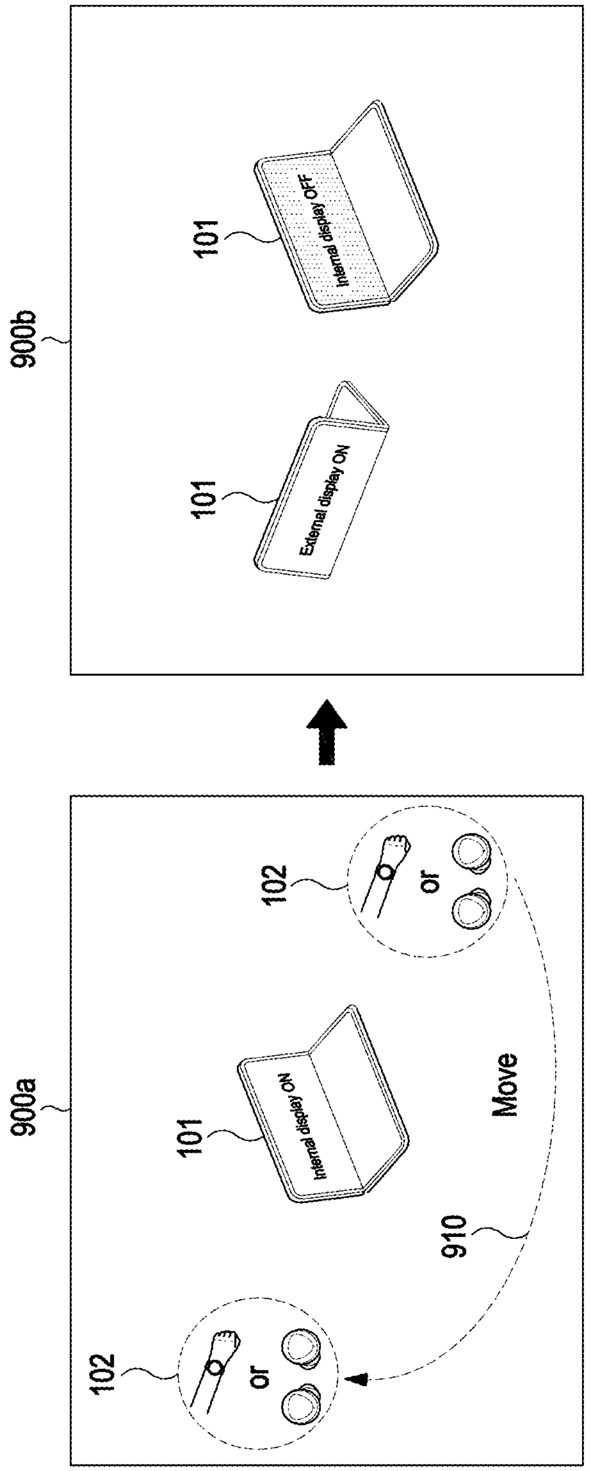
FIG. 9A is an example view illustrating a display switch when an external electronic device moves onto a rear range of directions of an electronic device according to an embodiment.
Figure 9B:
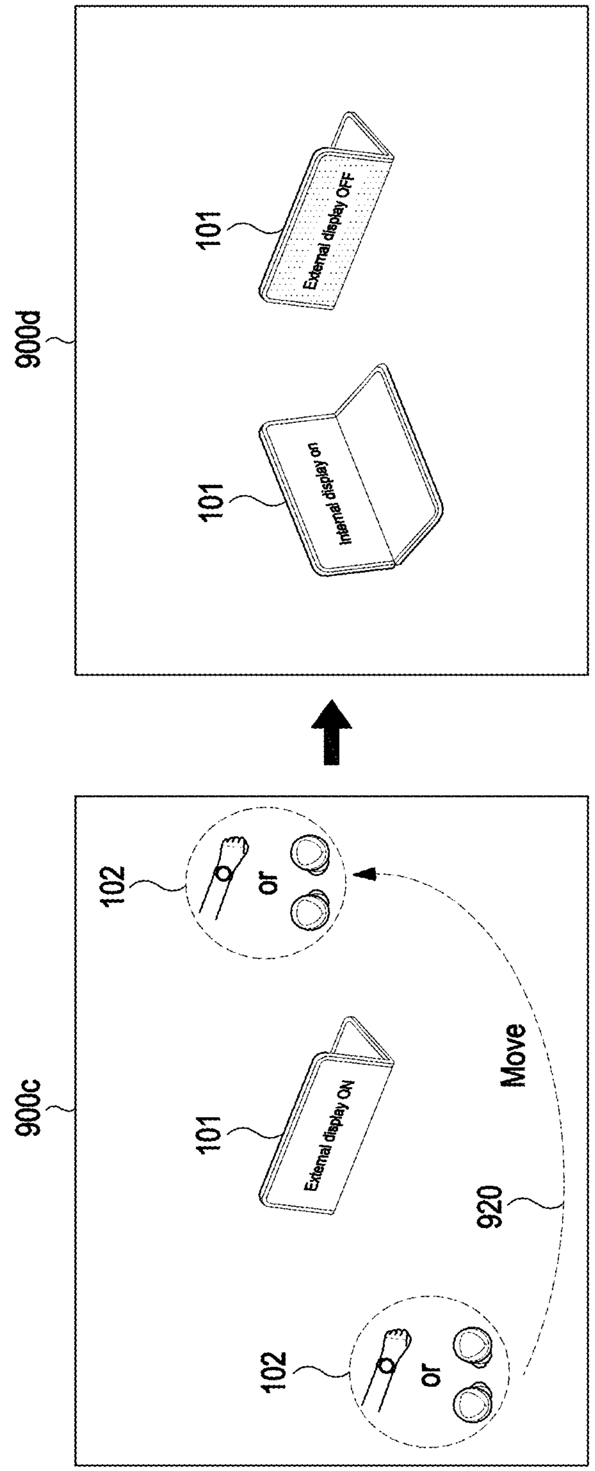
FIG. 9B is an example view illustrating a display switch when an external electronic device moves onto a front range of directions of an electronic device according to an embodiment.

FIGS. 9A and 9B may be referred to for a better understanding of the description of FIG. 8. FIG. 9A is an example view illustrating a display switch when an external electronic device moves into a rear range of directions of an electronic device. FIG. 9B is an example view illustrating a display switch when an external electronic device moves into a front range of directions of an electronic device according to an embodiment.

In operation 805, the electronic device 101 may run a video application in the flex mode. The flex mode may mean a state in which the display is partially folded. For example, when the video application is executed in a partially folded state (i.e., flex mode) of a portion of the internal display (e.g., the first display 260), the electronic device 101 may play video through the partial display area (e.g., upper display area 260*a*) of the internal display. In an embodiment, the electronic device 101 may provide a function for playing video through the display corresponding to the direction of the user among the plurality of displays. For the purpose of identifying the user's direction with respect to the electronic device 101, the external electronic device 102 may be used, and the external electronic device 102 may be a wearable electronic device, which may be worn on the user's body portion.

In operation 810, the electronic device 101 may identify whether the electronic device 101 is in a state connected with (e.g., wirelessly connected for communication) the worn external electronic device 102. In operation 815, the electronic device 101 may identify the direction in which the external electronic device 102 is positioned with respect to the electronic device 101 (e.g., the front range of directions of the electronic device 101 in the flex mode) corresponding to identifying the state connected with the worn external electronic device 102.

In operation 820, the electronic device 101 may identify whether the external electronic device 102 is positioned in the front range of directions or the rear range of directions of the electronic device 101.

Corresponding to the external electronic device 102 positioned in the front range of directions of the electronic device 101, the electronic device 101 may determine whether video is being played through an external display (e.g., the second display 261) in operation 825. Unless the video is played through the external display, the electronic device 101 may keep on playing video through the internal display in operation 830. On the other hand, when the video is played through the external display, the electronic device 101 may switch the display to play the video into the internal display according to the external electronic device 102 positioned in the front range of directions in operation 835. According to an embodiment, when switching into the internal display (e.g., the first display 260) to play the video, which area of the upper or lower display area of the internal display to display the video may be determined according to the running application or depending on the user's selection.

Meanwhile, corresponding to the external electronic device 102 positioned in the rear range of directions of the electronic device 101, the electronic device 101 may determine whether the video is being played through the internal display in operation 840. Unless the video is played through the internal display, the electronic device 101 may keep on playing video through the external display (e.g., the second display 261) in operation 845. On the other hand, when the video is played through the internal display, the electronic device 101 may switch the display to play the video into the external display according to the external electronic device 102 positioned in the rear range in operation 850. According to an embodiment, operations 820 to 850 may be repeatedly performed unless the video playback through the video application is terminated, and operations 820 to 850 related to switching the display for playing the video on the electronic device 101 according to the direction of the external electronic device 102 may be referred to as operation A.

Referring to FIG. 9A, while the electronic device 101 plays video through the internal display which is in an on state, the external electronic device 102 worn on the user's body may move (910) into the rear range of directions of the electronic device 101 due to the user's movement as shown in 900*a*. When the external electronic device 102 is detected in the rear range of directions of the electronic device 101, the video playback through the internal display may be stopped, and then, the external display may be turned on to play the video through the external display as shown in 900*b*. As such, the display for playing the video may be determined to correspond to the direction in which the external electronic device 102 and the electronic device 101 face, and the electronic device 101 may switch, e.g., from the internal display to the external display and resume video playback through the switched external display as shown in 900*b*.

Referring to FIG. 9B, as shown in 900*c*, while playing the video through the external display in the on state, the external electronic device 102 may move (920) into the front range of directions of the electronic device 101 due to the user's movement. The electronic device 101 may identify the movement into the front range of directions of the electronic device 101 by tracking the moving direction of the external electronic device 102 with respect to the electronic device 101. When the external electronic device 102 is detected in the front range of directions of the electronic device 101, the video playback through the external display may be stopped, and then, the internal display may be turned on to play the video through the internal display as shown in 900*d*.

According to an embodiment, the electronic device 101 may continuously track the direction of the external electronic device 102 with respect to the electronic device 101 while playing the video, to determine the moving direction. As such, the display to provide the video may be switched according to the position of the user wearing the external electronic device 102, so that the user may identify the video through the display in several directions even without separate manipulation on the user side.

Figure 9C:
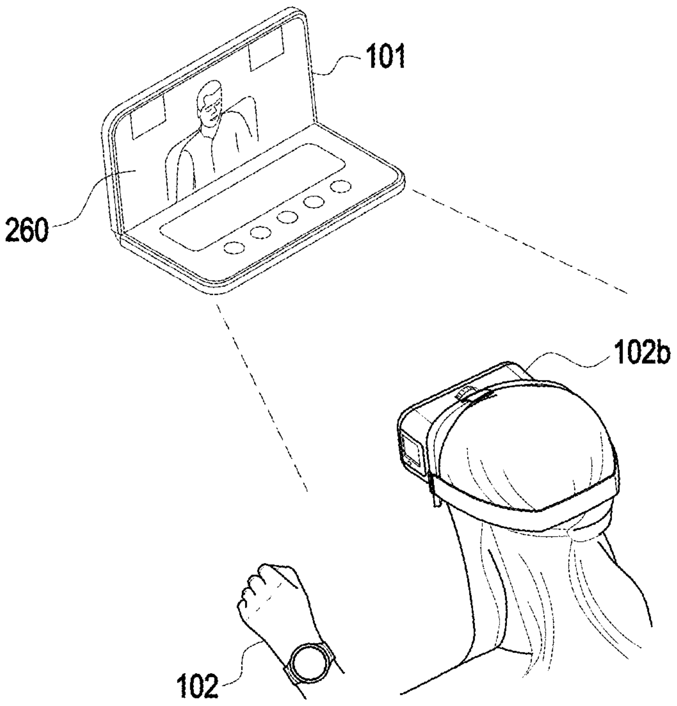
FIG. 9C is an example view illustrating a display switch according to the movement of another type of an external electronic device moves onto a rear surface of an electronic device according to an embodiment.
Figure 9C:
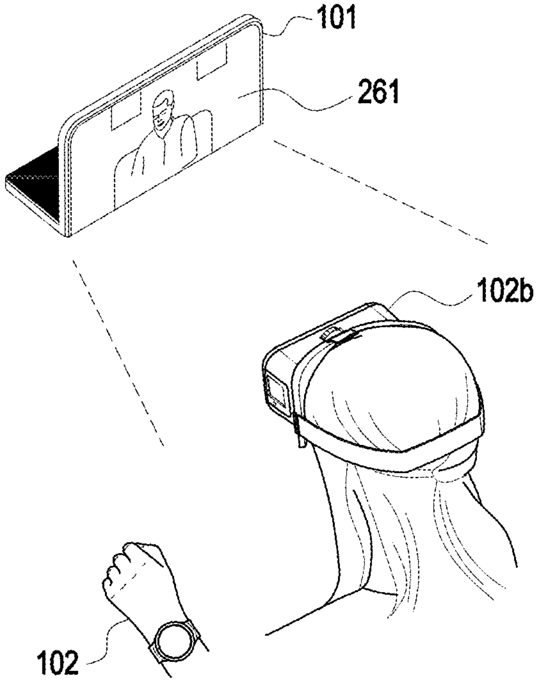

FIG. 9C is an example view illustrating a display switch according to the movement of another type of an external electronic device moves onto a rear surface of an electronic device according to an embodiment.

Referring to FIG. 9C, the display may be controlled based on two or more external electronic devices 102 and 102*b*. For example, the user may be in a state of wearing a plurality of external electronic devices including the wearable watch 102 and the head-mounted display 102*b*. In addition, the external electronic device may include a glasses-type AR glasses device in addition to a device configured to be worn on the user's body, for example, the head-mounted display 102*b*. Without limited thereto, the external electronic device may be implemented in other various forms wearable on the user's body. For example, the external electronic device may include a ring-shaped wearable device (e.g., a smart ring) that can be worn on a user's finger.

In an embodiment, since the external electronic device 102, such as a head-mounted display, includes a camera (e.g., ToF camera or eye tracking camera), not only distance information with the electronic device 101 may be grasped, but also the user's gaze may be tracked.

As shown in (a) of FIG. 9C, corresponding to the external electronic device 102 and 102*b* positioned in the front range of the electronic device 101, the electronic device 101 may play through an internal display 260. As shown in (b) of FIG. 9C, corresponding to the external electronic device 102 and 102*b* positioned in the rear range of directions of the electronic device 101, the electronic device 101 may play through an external display 261.

Figure 10:
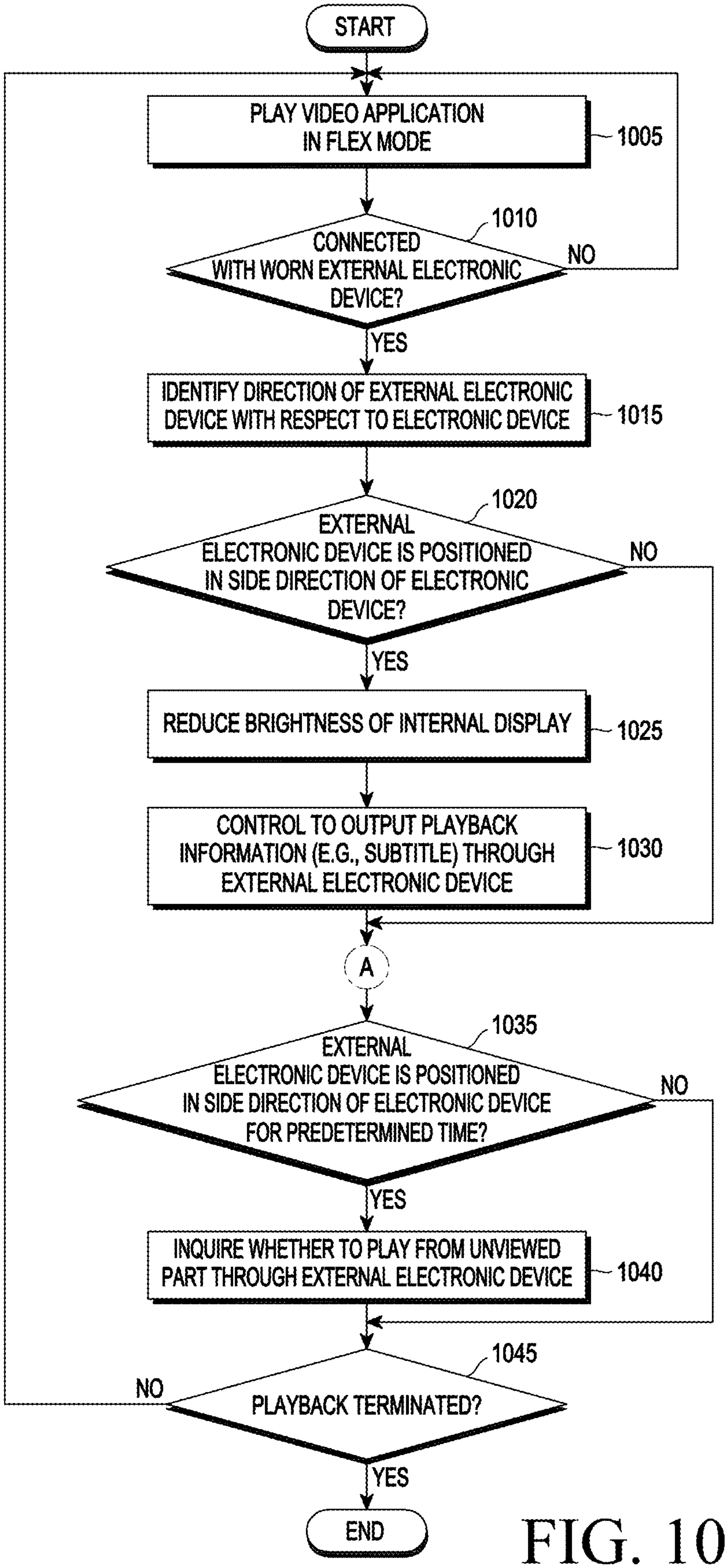
FIG. 10 is a flowchart illustrating operations of an electronic device for controlling a display corresponding to an external electronic device positioned on a side of the electronic device according to an embodiment.

FIG. 10 is a flowchart illustrating operations of an electronic device for controlling a display corresponding to an external electronic device positioned on a side of the electronic device according to an embodiment. Referring to FIG. 10, the operation method may include operations 1005 to 1045. Each operation of the operation method of FIG. 10 may be performed by an electronic device (e.g., at least one electronic device 101 of FIGS. 1 to 6B or at least one processor (e.g., the processor 120 of FIG. 1 or the processor 520 of FIG. 2) of the electronic device). In an embodiment, at least one of operations 1005 to 1045 may be omitted or changed in order or may add other operations.

Figure 11A:
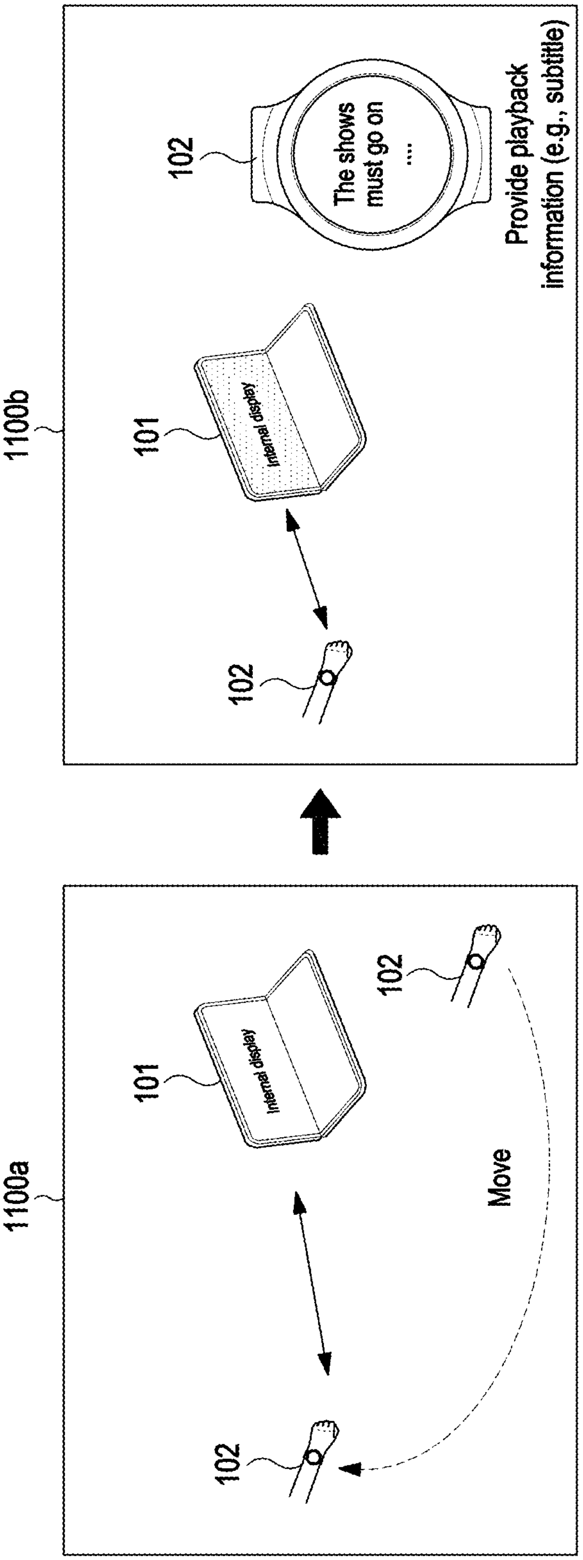
FIG. 11A is an example view illustrating a display switch when an external electronic device moves onto a side range of an electronic device according to an embodiment.
Figure 11B:
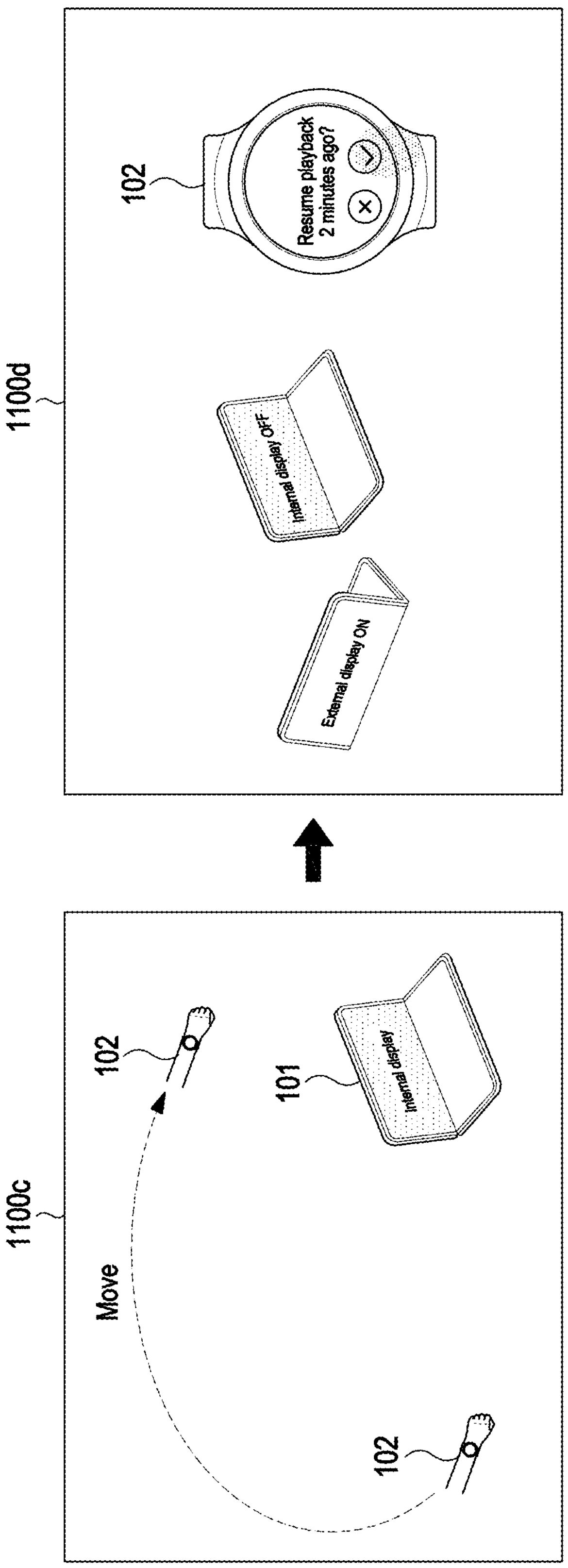
FIG. 11B is an example view illustrating a display switch when an external electronic device moves from a side range to a rear range of an electronic device according to an embodiment.

FIGS. 11A and 11B may be referred to for a better understanding of the description of FIG. 10. FIG. 11A is an example view illustrating a display switch when an external electronic device moves into a side range of an electronic device. FIG. 11B is an example view illustrating a display switch when an external electronic device moves from a side range into a rearrange of an electronic device according to an embodiment. Here, the "side range" (also referred to as the blind area) is a range which face neither the first surface 210*a* nor the second surface 220*a* of the electronic device 101. In other words, the side range is a range near the electronic device 101 except for the front range 610 and the second range 620.

Operations 1005 to 1015 are the same as operations 805 to 815 of FIG. 8, respectively, and no detailed description thereof is repeated.

In operation 1020, the electronic device 101 may identify whether the external electronic device 102 is positioned in a side range of the electronic device 101. For example, if the direction of the external electronic device 102 with respect to the electronic device 101 falls outside the first position or the directional range corresponding to the first recognition range (e.g., 610 of FIGS. 6A and 6B) and/or the second position or the directional range corresponding to the second recognition range (e.g., 620 of FIGS. 6A and 6B) with respect to the upper display area 260*a* of the first display 260 of the electronic device 101, the electronic device 101 may identify that the electronic device 101 is positioned in a side range of the electronic device 101. According to an embodiment, when the external electronic device 102 is positioned in a range (e.g., side range) off the first recognition range and/or second recognition range as the user wearing the external electronic device 102 moves, the user may not identify the screen content although viewing the display.

When the external electronic device 102 is detected in the side range of the electronic device 101, the electronic device 101 may reduce the brightness of the internal display that is playing a video, in operation 1025. Further, in operation 1030, the electronic device 101 may control to output playback information (e.g., subtitle) through the external electronic device 102. According to an embodiment, when the external electronic device 102 is detected in the side range of the electronic device 101, any one of operation 1025 or operation 1030 may be performed. In other words, any one of operation 1025 or operation 1030 may be omitted.

Thereafter, operation A related to switching the display to play the video on the electronic device 101 corresponding to the direction of the external electronic device 102 may be performed, and operation A is the same as operations 820 to 850 of FIG. 8 and a detailed description thereof is omitted.

While video is being played through the external display or internal display corresponding to the position or direction of the external electronic device 102, the electronic device 101 may identify whether the external electronic device 102 had been positioned for a predetermined time in the side range in operation 1035. If positioned for the predetermined time, a message for inquiring whether to play the video from the unviewed portion (e.g., part of the video played when the external electronic device 102 moves off the front range 610 or the rear range 620) may be output through the external electronic device 102 in operation 1040. If the external electronic device 102 is not positioned in the side range for the predetermined time, it may be identified whether the video playback is terminated in operation 1045. Accordingly, unless the video playback is terminated, the electronic device 101 may repeat the above-described operations.

For example, referring to FIG. 11A, the electronic device 101 may continuously track direction changes (or moving direction) in the external electronic device 102. While the electronic device 101 plays a video through the internal display which is in an on state, the external electronic device 102 worn on the user's body may move into the side range of the electronic device 101 due to the user's movement as shown in 1100*a*. When the external electronic device 102 is detected in the side range of the electronic device 101, the electronic device 101 may reduce the brightness of the internal display that is playing the video, as shown in 1100*b*. Further, according to an embodiment, the electronic device 101 may provide the external electronic device 102 with information related to video playback to allow the external electronic device 102 to output information (e.g., subtitle information) related to video playback.

Referring to FIG. 11B, as shown in 1100*c*, the external electronic device 102 may move from the position in the side range of the electronic device 101 into the rear range of the electronic device 101 due to the user's movement. While the electronic device 101 is positioned in the side range for a predetermined time (e.g., three seconds or longer), the brightness of the internal display may be reduced to save battery. When the external electronic device 102 is detected in the rear range of the electronic device 101 due to the user's movement, as shown in 1100*d*, the electronic device 101 may turn off the internal display and play the video through the external display (e.g., the second display 261).

When the external electronic device 102 used to be positioned in the side range of the electronic device 101 is detected in the rear range (or front range), the user has not viewed the video yet due to staying in the side range. In an embodiment, the electronic device 101 may provide a function for playing the video from the unviewed portion thereof according to the user's selection. For example, as shown in 1100*d*, the electronic device 101 may provide the user with a function for identifying (or viewing) video again from the timing of falling outside the first range of directions (e.g., the first recognition range 610 of FIGS. 6A and 6B), and the user's selection of such function may be obtained through the external electronic device 102. Unless the user selects the menu popping up on the display of the external electronic device 102, the popup may automatically be removed in a designated time (e.g., 10 seconds).

Figure 12:
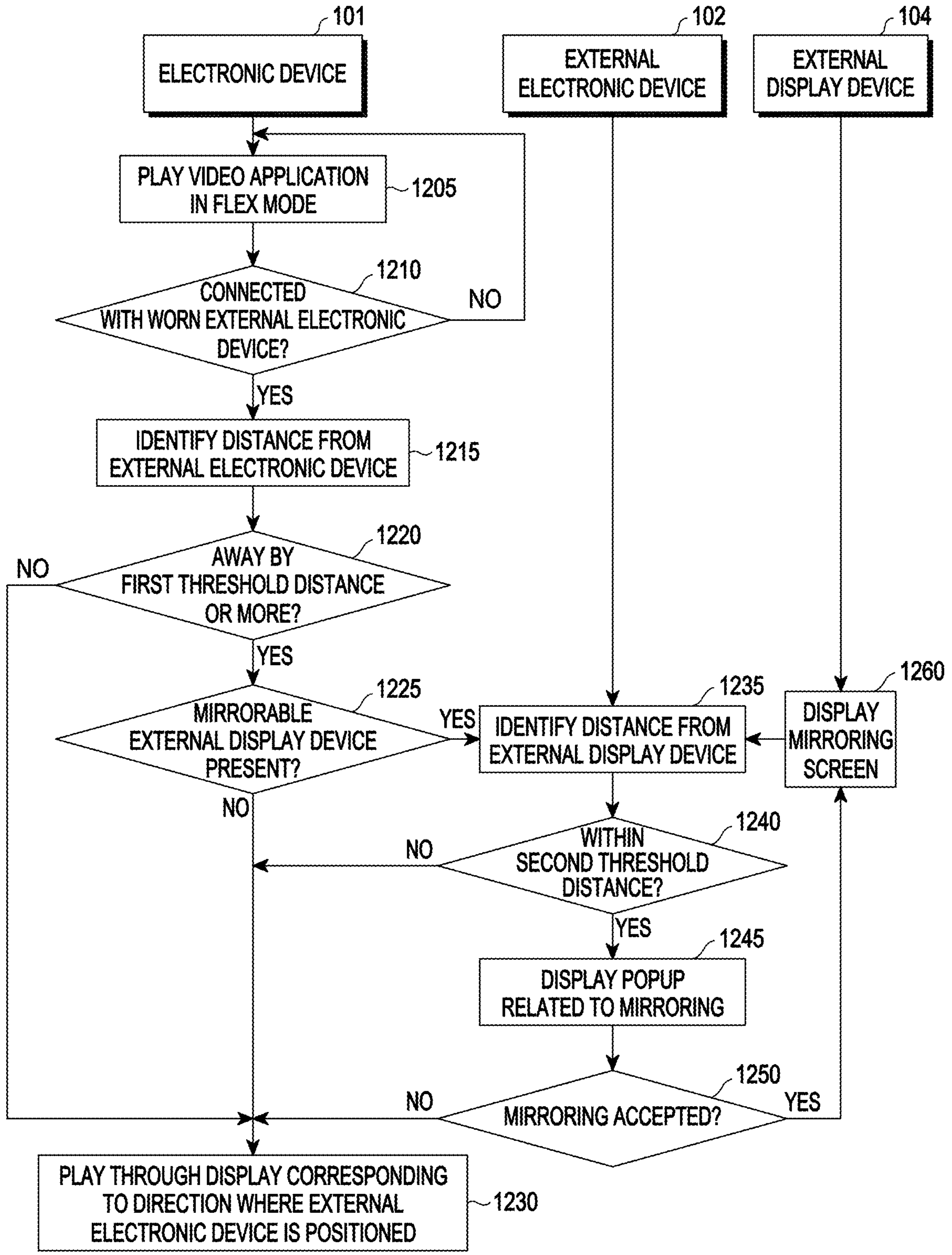
FIG. 12 is a view illustrating signal flows between an electronic device for mirroring, an external electronic device, and an external display device according to an embodiment.

FIG. 12 is a view illustrating signal flows between an electronic device for mirroring, an external electronic device, and an external display device according to an embodiment. In an embodiment, at least one of operations 1205 to 1260 may be omitted or changed in order or may add other operations.

Figure 13:
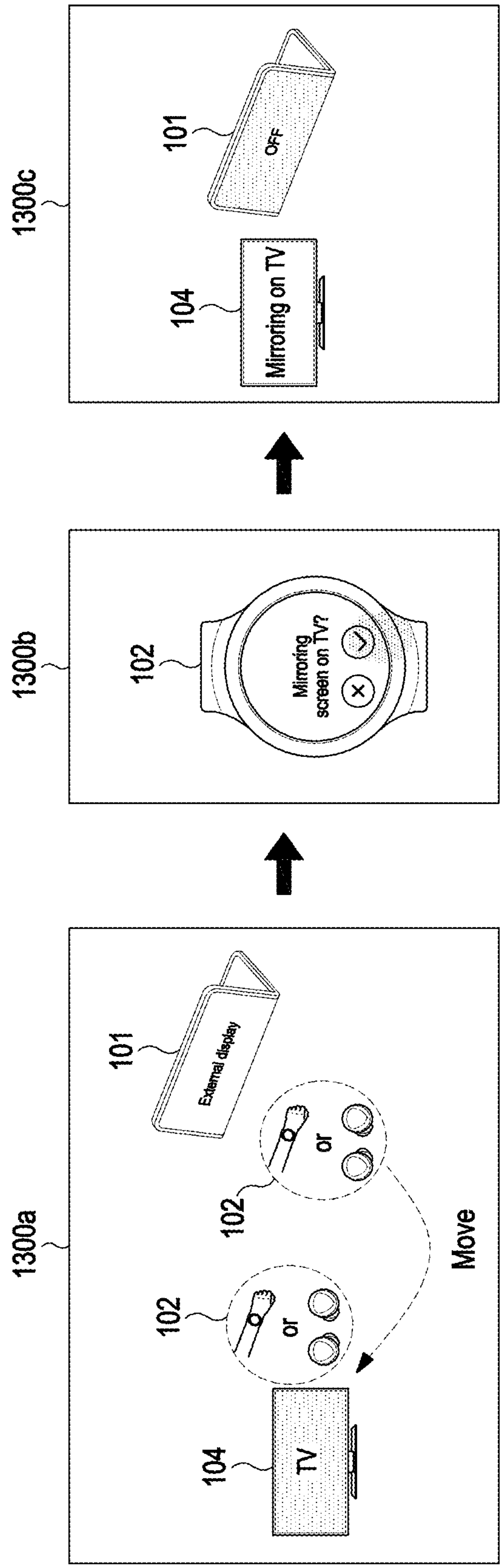
FIG. 13 is an example view illustrating a display switch when an external electronic device moves toward an external display device according to an embodiment.
Figure 14:
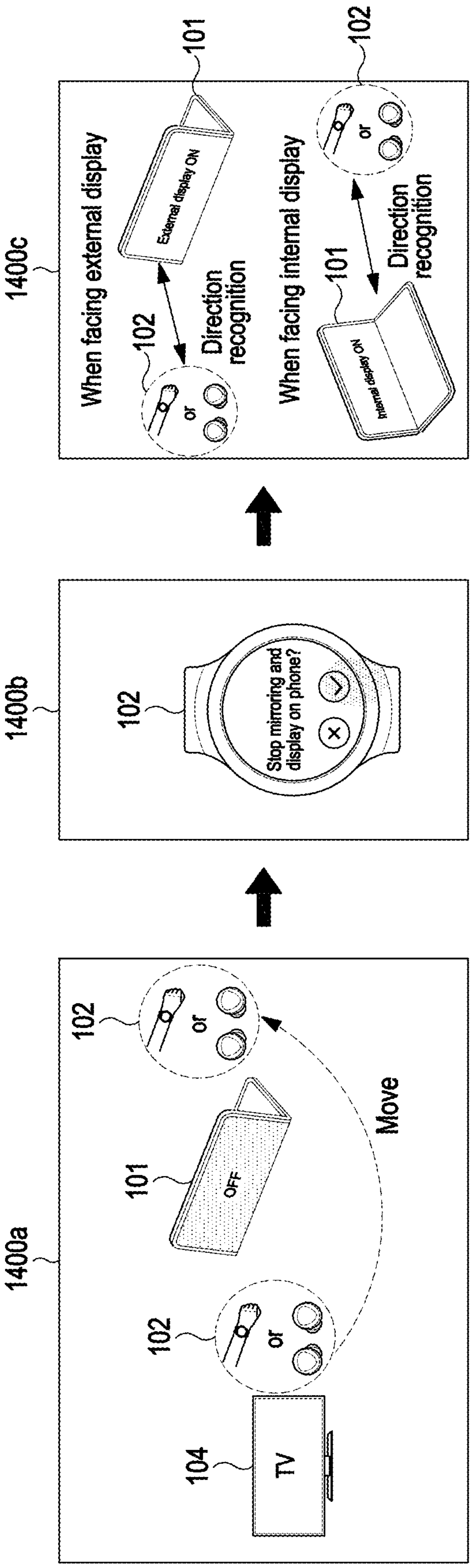
FIG. 14 is an example view illustrating a display switch when an external electronic device moves from an external display device to an electronic device according to an embodiment.

FIGS. 13 and 14 may be referred to for a better understanding of the description of FIG. 12. FIG. 13 is an example view illustrating a display switch when an external electronic device moves toward another external display device according to an embodiment. FIG. 14 is an example view illustrating a display switch when an external electronic device moves back from another external display device to an electronic device according to an embodiment.

Operations 1205 and 1210 of FIG. 12 are the same as operations 805 and 810 of FIG. 8, respectively, and a detailed description thereof is omitted.

In operation 1215, the electronic device 101 may identify the distance from the external electronic device 102. For example, the electronic device 101 may identify the distance from the electronic device 101 to the external electronic device 102 based on wireless communication scheme such as the UWB communication scheme and BLE communication scheme.

In operation 1220, the electronic device 101 may identify the state in which the electronic device 101 is away from the external electronic device 102 by a first threshold distance (e.g., 3 meters) or more. When away by the first threshold distance or more, in operation 1225, the electronic device 101 may identify whether there is an mirrorable external display device 104. In contrast, unless away by the first threshold distance or more, the electronic device 101 may perform operation 1230.

When there is a mirrorable external display device 104, in operation 1235, the external electronic device 102 may identify the distance from the external display device 104. In operation 1240, the external electronic device 102 may identify whether the external electronic device 102 is within a second threshold distance (e.g., 2 meters) from the external display device 104. Here, the second threshold distance may be smaller than the first threshold distance, and being smaller than the second threshold distance may mean that the external electronic device 102 is positioned closer to the external display device 104 than the electronic device 101. If not within the second threshold distance, although there is a mirrorable external display device 104 around the external electronic device 102, it means that it is farther away than the electronic device 101, so that mirroring may not be performed.

In contrast, when the external display device 104 is within the second threshold distance, in operation 1245, the external electronic device 102 may display a mirroring-related popup. According to an embodiment, the external electronic device 102 may display a popup including an item capable of selection as to whether to mirror the video screen being played through the discovered external display device 104.

In operation 1250, the external electronic device 102 may identify whether mirroring is accepted and, if mirroring is accepted by the user's selection, the acceptance may be indicated to the external display device 104. Corresponding to this, the external display device 104 may display a mirroring screen in operation 1260.

Referring to FIG. 13, as shown in 1300*a*, the external electronic device 102 may be away from the electronic device 101 by the first threshold distance or more, and the mirrorable external display device 104 may be discovered within the second threshold distance. In this case, as shown in 1300*b*, the external electronic device 102 may output (e.g., display) the content to inquire whether to mirror to the external display device 104. When the user selects mirroring, the display of the electronic device 101 which is playing a video may be turned off, and the screen according to the video playback may be output through the external display device 104 as shown in 1300*c*. That is the "mirroring" function.

While the mirroring screen is displayed on the external display device 104, the external electronic device 102 may continuously identify the distance from the external display device 104 to the external electronic device 102 in operation 1235. Accordingly, when the distance from the external display device 104 is away by the second threshold distance or more, the mirroring may be stopped.

Accordingly, in operation 1230, the electronic device 101 may play the video through the display thereof, among several displays (e.g., first display 260 and second display 261) of the electronic device 101, corresponding to the direction in which the external electronic device 102 is positioned with respect to the electronic device 101. For example, when there is no mirrorable external display device 104 around or the external electronic device 102 is away from the external display device 104 by the second threshold distance or more during mirroring, the electronic device 101 may perform operation 1230.

Referring to FIG. 14, when the external electronic device 102 is away from the external display device 104 by the second threshold distance or more due to the user's movement, and the distance from the electronic device 101 to the external electronic device 102 is within the first threshold distance as shown in 1400*a* after user's movement to the electronic device 101, the external electronic device 102 may output (e.g., display) the content to inquire whether to stop mirroring through the external display device 104 as shown in 1400*b*. When the user selects to stop mirroring, the mirroring through the external display device 104 may be stopped and, as shown in 1400*c*, the electronic device 101 may play video through the display thereof corresponding to the direction of the external electronic device 102 with respect to the electronic device 101.

In an embodiment regarding 1400*c* of FIG. 14, as shown in FIGS. 6A and 6B, an example of identifying whether the direction of the external electronic device 102 is in the first recognition range 610 or in the second recognition range 620 of the electronic device 101 and switching into the display corresponding to the identified direction is described, but embodiments of the disclosure may not be limited thereto. For example, when a UWB communication scheme is used, the electronic device 101 may not only identify at least one of the direction and/or distance of the external electronic device 102 but also identify the vertical movement of the external electronic device 102 with respect to the electronic device 101.

Figure 15:
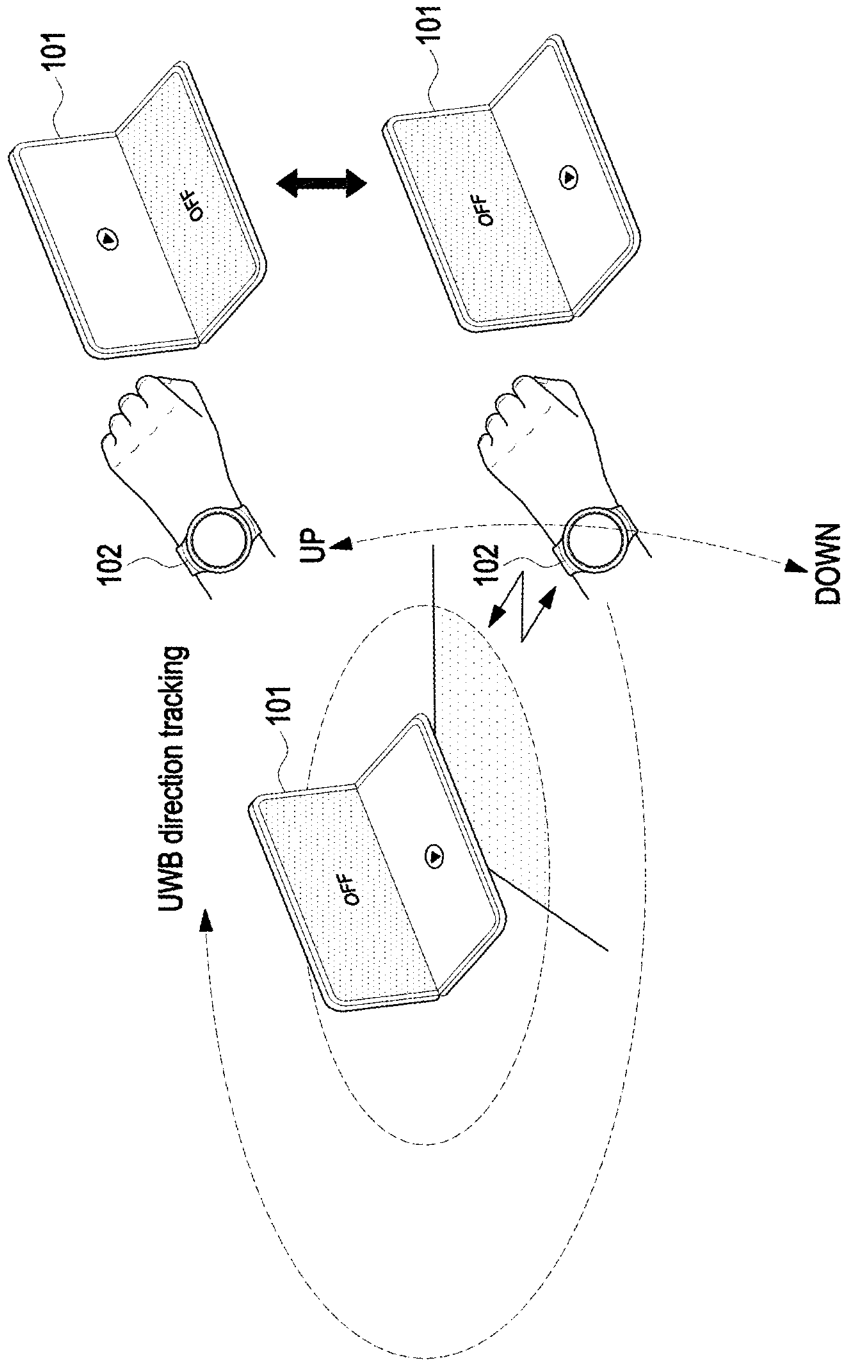
FIG. 15 is an example view illustrating a display switch when an external electronic device moves in an upper/lower direction of an electronic device according to an embodiment.

FIG. 15 is an example view illustrating a display switch when an external electronic device moves in an upper/lower direction of an electronic device according to an embodiment.

As illustrated in FIG. 15, the external electronic device 102 worn on the user's body may be moved in an upper or lower direction according to the user's movement, and the electronic device 101 may identify the vertical movement through UWB altitude tracking as well as UWB direction tracking. According to an embodiment, it is possible to switch the display to play the video between the upper display area (e.g., a display area located in an upper position of the first display area 260*a* and the second display area 260*b*) and the lower display area (e.g., a display area located in an lower position of the first display area 260*a* and the second display area 260*b*), which are separated according to partial folding of the first display 260, based on the upward/downward movement of the external electronic device 102. For example, when the upward movement of the external electronic device 102 is detected in a state in which content is displayed in the upper display area of the first display 260, the electronic device 101 may switch the display to play the content into the lower display area and display the content on the lower display area.

According to an embodiment, upon upward or downward movement of the external electronic device 102, the electronic device 101 may control content display in a manner to switch from the lower display area to upper display area or from the upper display area to lower display area.

As illustrated in FIG. 15, the state in which the image is displayed in the lower display area may be a state in which the user looks downward, i.e., a state in which the wearable watch (i.e., the external electronic device 102) is positioned upward. When a movement of the wearable watch from the upper position to the lower position in a state in which the content is displayed in the lower display area, the electronic device 101 may switch the display to play the content into the upper display area. Further, upon detecting the movement of the wearable device from the lower position to the upper position in a state in which the image is displayed in the upper display area, the electronic device 101 may switch the display to play the content to the lower display area. In an embodiment, the upper position may be a position higher than the electronic device 101, and the lower position may be a position substantially the same height with the electronic device 101. In another embodiment, the upper position may be a position within a predetermined angle range with respect to a normal direction to the second display area 260*b*, and the lower position may be a position within a predetermined angle range with respect to a normal direction to the first display area 260*a*.

Figure 16:
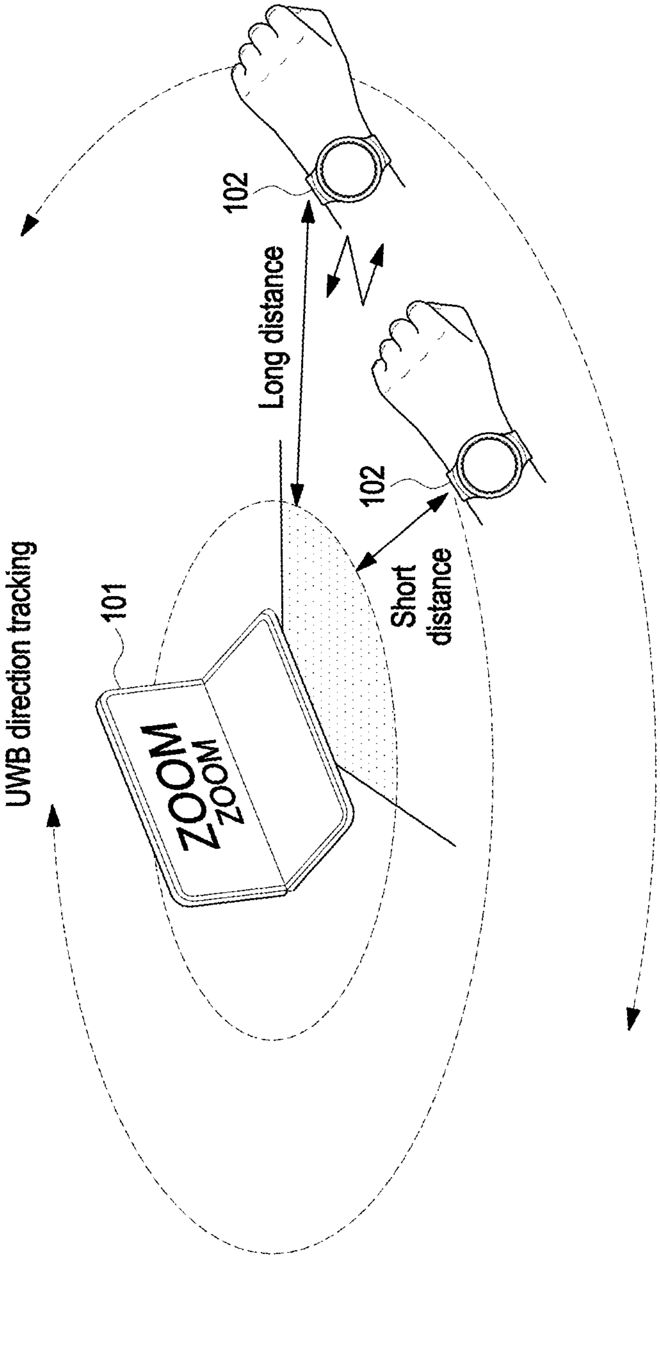
FIG. 16 is an example view illustrating a display switch according to the distance from an external electronic device according to an embodiment.

FIG. 16 is an example view illustrating a display switch according to the distance from an external electronic device according to an embodiment.

Referring to FIG. 16, the user may set a function for controlling the zoom-in/zoom-out according to the distance from the electronic device 101 to the external electronic device 102 through the settings menu. The electronic device 101 may also identify the distance from the external electronic device 102 according to the UWB communication scheme. As such, the UWB AOA measurement scheme may measure the distance, as well as the azimuth and elevation angles for the external electronic device 102. For example, upon capture through the camera application, the electronic device 101 may identify the distance from the external electronic device 102 and switch the function of the camera application to a wide-angle capture function or telephoto capture function depending on the distance from the external electronic device 102. Further, the electronic device 101 may identify the distance from the external electronic device 102 while displaying exercise video through a health application and enlarge or shrink and display the figure in the exercise video depending on the distance from the external electronic device 102.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, a non-volatile storage medium stores instructions configured to, when executed by at least one processor 120 or 520 of an electronic device 101, enable the electronic device to perform at least one operation. The at least one operation includes outputting an content through a first display of the electronic device, identifying a direction of an external electronic device connected to the electronic device through short-range communication scheme with respect to the electronic device while outputting the content, in response to identifying that the direction of the external electronic device is within a first range of directions, keeping outputting the content through the first display, and in response to identifying that the direction of the external electronic device is within a second range of directions, outputting the content through a second display disposed in a direction opposite to the first display.

What is claimed is:

1. An electronic device (101) comprising:

a first display (260) disposed in a front surface of the electronic device;

a second display (261) disposed in a rear surface of the electronic device;

at least one processor (120 or 520); and memory storing instructions that, when executed by the at least one processor individually or collectively, cause the electronic device to:

output content through the first display, identify a direction from the electronic device toward an external electronic device, connected to the electronic device through a short-range communication scheme, while outputting the content, in response to identifying that the direction from the electronic device toward the external electronic device is within a first range of directions, keep outputting the content through the first display of the electronic device, identify whether the direction from the electronic device toward the external electronic device changes to fall outside the first range of directions while keeping outputting the content through the first display, and in response to identifying that the direction from the electronic device toward the external electronic device changes to fall outside the first range of directions, reduce a brightness of the first display, wherein the first range of directions correspond to a predetermined front-facing direction range of the first display.

2. The electronic device of claim 1, wherein as the first display is partially folded, the first display is divided into a first display area and a second display area with a folding axis therebetween, wherein the first range of directions is within a predetermined azimuthal angle range with respect to a normal direction of the first display area.

3. The electronic device of claim 1, wherein the instructions further cause the electronic device to:

in response to identifying that the direction from the electronic device toward the external electronic device changes to fall outside the first range of directions while keeping outputting the content through the first display, identify whether the direction from the electronic device toward the external electronic device is within a second range of directions, and in response to identifying that the direction from the electronic device toward the external electronic device is within the second range of directions, output the content through the second display, wherein the second range of directions corresponds to a rear range of directions which is opposite to the first range of directions.

4. The electronic device of claim 1, wherein the instructions further cause the electronic device to:

in response to identifying that the direction from the electronic device toward the external electronic device changes to fall outside the first range of directions, identify that the external electronic device is positioned in a side range of the electronic device, and in response to identifying that the external electronic device is positioned in the side range of the electronic device, reduce the brightness of the first display while keeping outputting a sound of the content through a speaker.

5. The electronic device of claim 3, wherein the instructions further cause the electronic device to:

in response to identifying that the direction from the electronic device toward the external electronic device changes to fall outside the first range of directions and outside the second range of directions, control the external electronic device to output information about the content being output while keeping outputting the content through the first display, and wherein the information includes at least one of a subtitle representing the content being output, playback time information about the content being output, or whether to stop playing the content being output.

6. The electronic device of claim 5, wherein the instructions further cause the electronic device to:

in response to identifying that an input for stop playing the content being output is received from the external electronic device, stop outputting the content through the first display.

7. The electronic device of claim 5, wherein the instructions further cause the electronic device to:

in response to identifying that the external electronic device is positioned in a side range of the electronic device and an input for stop playing the content being output is not received from the external electronic device, reduce a brightness of the first display while keeping playing the content.

8. The electronic device of claim 3, wherein the instructions further cause the electronic device to:

in response to identifying that the direction from the electronic device toward the external electronic device is within the second range of directions after a predetermined time, provide a guide related to a playback timing of the content to be output through the second display.

9. The electronic device of claim 1, wherein the instructions further cause the electronic device to identify the direction and/or distance from the electronic device toward the external electronic device based on at least one of an ultra-wide band (UWB) communication scheme or a Bluetooth low energy (BLE) communication scheme.

10. The electronic device of claim 1, wherein the instructions further cause the electronic device to:

identify a connection with the external electronic device, and identify whether the connected external electronic device is worn on a user's body portion and identify the direction from the electronic device toward the external electronic device, based on the external electronic device identified as worn.

11. A method for controlling a display corresponding to a direction of an external electronic device by an electronic device, the method comprising:

outputting content through a first display disposed in a front surface of the electronic device;

identifying, by the electronic device, a direction from the electronic device toward the external electronic device connected to the electronic device through short-range communication scheme while outputting the content;

in response to identifying that the direction from the electronic device toward the external electronic device is within a first range of directions, keeping outputting the content through the first display of the electronic device;

identifying whether the direction from the electronic device toward the external electronic device changes to fall outside the first range of directions while keeping outputting the content through the first display; and in response to identifying that the direction from the electronic device toward the external electronic device changes to fall outside the first range of directions, reducing a brightness of the first display, wherein the first range of directions corresponds to a predetermined front-facing direction range of the first display.

12. The method of claim 11, wherein as the first display is partially folded, the first display is divided into a first display area and a second display area with a folding axis therebetween, wherein the first range of directions is within a predetermined azimuthal angle range with respect to a normal direction of the first display area.

13. The method of claim 11, further comprising:

when the direction from the electronic device toward the external electronic device changes to fall outside the first range of directions while keeping outputting the content through the first display, identifying whether the direction from the electronic device toward the external electronic device is within a second range of directions; and in response to identifying that the direction from the electronic device toward the external electronic device is within the second range of directions, outputting the content through a second display disposed in a rear surface of the electronic device, wherein the second range of directions corresponds to a rear range of directions which is opposite to the first range of directions.

14. The method of claim 11, further comprising:

in response to identifying that the direction from the electronic device toward the external electronic device changes to fall outside the first range of directions, identify that the external electronic device is positioned in a side range of the electronic device, and in response to identifying that the external electronic device is positioned in the side range of the electronic device, reducing the brightness of the first display while keeping outputting a sound of the content through a speaker.

15. The method of claim 13, further comprising:

when the direction from the electronic device toward the external electronic device changes to fall outside the first range of directions and outside the second range of directions, controlling the external electronic device to output information about the content being output while keeping outputting the content through the first display, wherein the information includes at least one of a subtitle representing the content being output, playback time information about the content being output, or whether to stop playing the content being output.

16. The method of claim 15, further comprising:

in response to identifying that an input for stop playing the content being output is received from the external electronic device, stopping outputting the content through the first display.

17. The method of claim 15, further comprising:

in response to identifying that the external electronic device is positioned in a side range of the electronic device and an input for stop playing the content being output is not received from the external electronic device, reducing a brightness of the first display while keeping playing the content.

18. The method of claim 13, further comprising:

in response to identifying that the direction from the electronic device toward the external electronic device is within the second range of directions after a predetermined time, providing a guide related to a playback timing of the content to be output through the second display.

19. The method of claim 11, wherein identifying the direction from the electronic device toward the external electronic device includes identifying the direction and/or a distance of the external electronic device with respect to the electronic device based on at least one of an ultra-wide band (UWB) communication scheme or a Bluetooth low energy (BLE) communication scheme.

20. A non-transitory storage medium storing instructions configured to, when executed by at least one processor (120) of an electronic device (101), enable the electronic device to perform at least one operation, the at least one operation comprising:

outputting a content through a first display disposed in a front surface of the electronic device;

identifying a direction from the electronic device toward an external electronic device connected to the electronic device through short-range communication scheme with respect to the electronic device while outputting the content;

in response to identifying that the direction from the electronic device toward the external electronic device is within a first range of directions, keeping outputting the content through the first display;

identifying whether the direction from the electronic device toward the external electronic device changes to fall outside the first range of directions while keeping outputting the content through the first display; and in response to identifying that the direction from the electronic device toward the external electronic device changes to fall outside the first range of directions, reducing a brightness of the first display, wherein the first range of directions corresponds to a predetermined front-facing direction range of the first display.

* * * * *